United States Patent
Pierce et al.

(10) Patent No.: US 10,579,122 B2
(45) Date of Patent: Mar. 3, 2020

(54) DETERMINING USE CONTEXT FOR A CHARGING DEVICE AND DISPLAYING A CONTEXTUALLY APPROPRIATE USER INTERFACE

(71) Applicant: Samsung Electronics Co., Ltd., Gyeonggi-do (KR)

(72) Inventors: Jeffrey S. Pierce, Sunnyvale, CA (US); Ranhee Chung, San Francisco, CA (US); Praveen Jayakumar, Union City, CA (US)

(73) Assignee: SAMSUNG ELECTRONICS CO., LTD., Suwon-Si, Gyeonggi-do (KR)

( * ) Notice: Subject to any disclaimer, the term of this patent is extended or adjusted under 35 U.S.C. 154(b) by 118 days.

(21) Appl. No.: 15/814,249

(22) Filed: Nov. 15, 2017

(65) Prior Publication Data

US 2018/0253136 A1 Sep. 6, 2018

Related U.S. Application Data

(60) Provisional application No. 62/467,392, filed on Mar. 6, 2017.

(51) Int. Cl.
*G06F 1/32* (2019.01)
*G06F 1/3212* (2019.01)
(Continued)

(52) U.S. Cl.
CPC ............. *G06F 1/3212* (2013.01); *G06F 1/28* (2013.01); *G06F 3/0484* (2013.01);
(Continued)

(58) Field of Classification Search
CPC .... G06F 1/3212; G06F 3/0484; G06F 3/0488; G06F 11/3003; G06F 1/263
See application file for complete search history.

(56) References Cited

U.S. PATENT DOCUMENTS

| 9,031,618 B1 | 5/2015 | Kader |
| 9,348,555 B2 | 5/2016 | Scholz et al. |

(Continued)

FOREIGN PATENT DOCUMENTS

| JP | 2003-289363 A | 10/2003 |
| JP | 5348284 B2 | 11/2013 |

(Continued)

OTHER PUBLICATIONS

Novak, B., "Developing a Multi-Channel Wireless Inductive Charger," Texas Instruments Incorporated, White Paper SPRY213, Aug. 2012, 5 pg.

(Continued)

*Primary Examiner* — Zahid Choudhury
(74) *Attorney, Agent, or Firm* — Cuenot, Forsythe & Kim, LLC

(57) ABSTRACT

A detection can be made that a device is in a power charging state. Responsive to detecting that the device is in the power charging state, a current device use context associated with the power charging state can be determined. A user interface that corresponds to the current device use context associated with the power charging state can be selected. While the device is in the power charging state, the selected user interface can be presented.

25 Claims, 11 Drawing Sheets

(51) Int. Cl.
*G06F 11/30* (2006.01)
*G06F 3/0484* (2013.01)
*G06F 1/28* (2006.01)
*G06F 3/0488* (2013.01)
*G06F 1/26* (2006.01)

(52) U.S. Cl.
CPC ........ *G06F 3/0488* (2013.01); *G06F 11/3003* (2013.01); *G06F 11/3013* (2013.01); *G06F 11/3051* (2013.01); *G06F 11/3055* (2013.01); *G06F 11/3058* (2013.01); *G06F 11/3089* (2013.01); *G06F 1/263* (2013.01)

(56) References Cited

U.S. PATENT DOCUMENTS

| | | | |
|---|---|---|---|
| 2004/0098571 A1 | 5/2004 | Falcon | |
| 2011/0234152 A1* | 9/2011 | Frossen | H02J 7/0044 320/107 |
| 2013/0082638 A1* | 4/2013 | Liang | H02J 7/0068 320/103 |
| 2013/0181663 A1* | 7/2013 | Jung | H02J 7/007 320/107 |
| 2014/0157143 A1 | 6/2014 | Ronkainen et al. | |
| 2014/0201675 A1 | 7/2014 | Joo et al. | |
| 2015/0106737 A1 | 4/2015 | Montoy-Wilson et al. | |
| 2018/0183254 A1* | 6/2018 | Park | H01M 10/425 |

FOREIGN PATENT DOCUMENTS

| | | |
|---|---|---|
| JP | 5698583 B2 | 4/2015 |
| KR | 20060025679 A | 3/2006 |
| KR | 0688959 B1 | 3/2007 |
| KR | 20130078238 A | 7/2013 |
| KR | 20150022303 A | 3/2015 |
| KR | 101661970 B1 | 10/2016 |
| WO | 2018164456 A1 | 9/2018 |

OTHER PUBLICATIONS

Purewal, S.J., "How to Set Up Daydream: Android's Overlooked, Customizable Docking Screen," [online] Greenbot, IDG Communications, Inc. © 2017, May 9, 2014, Retrieved from the Internet: <https://www.greenbot.com/article/2151960/how-to-set-up-daydream-android-s-overlooked-customizable-docking-screen.html>, 7 pg.

"ZeroTouch," [online] Logitech © 2017, retrieved from the Internet: <https://www.logitech.com/en-us/product/zerotouch-car-phone-holder>,11 pg.

WIPO Appln. No. PCT2018002653, International Search Report, dated Jun. 14, 2018, 3 pg.

WIPO Appln. No. PCT2018002653, Written Opinion, dated Jun. 14, 2018, 6 pg.

EPO Appln. EP18764811.8, Extended Search Report, Dec. 18, 2019, 7 pg.

* cited by examiner

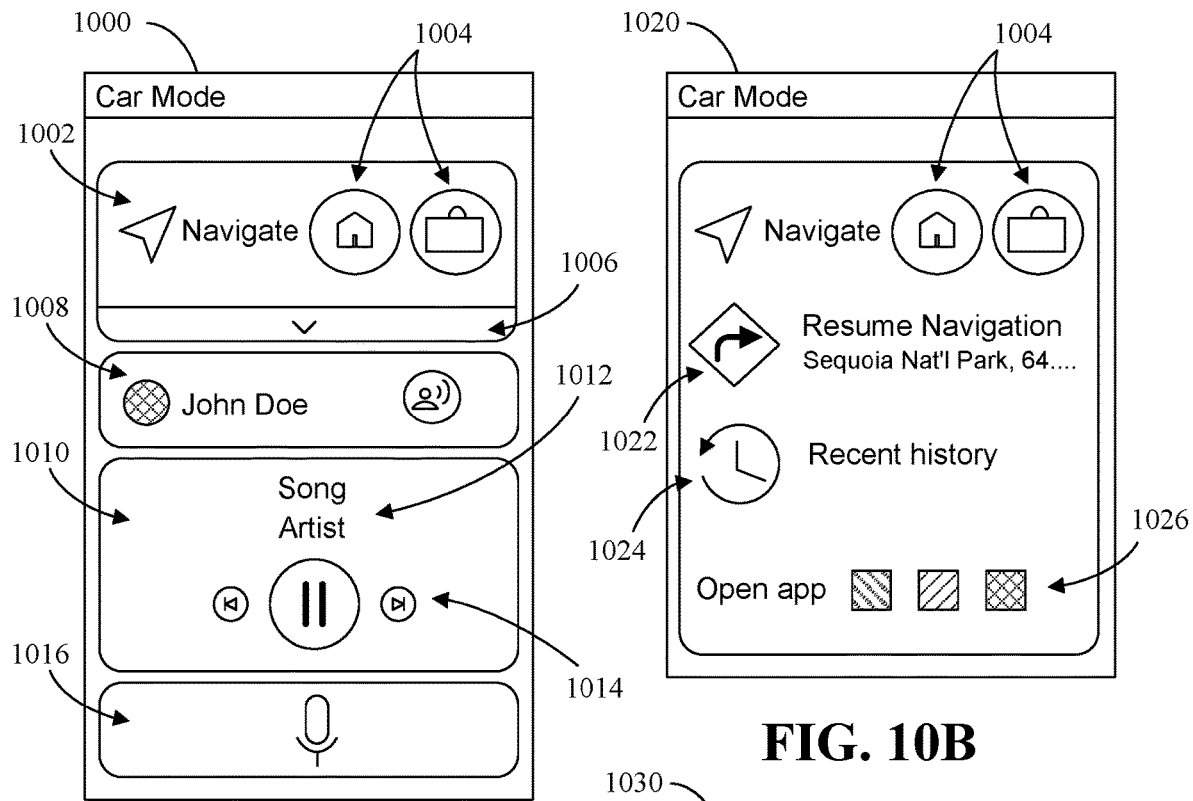
FIG. 10A
FIG. 10B
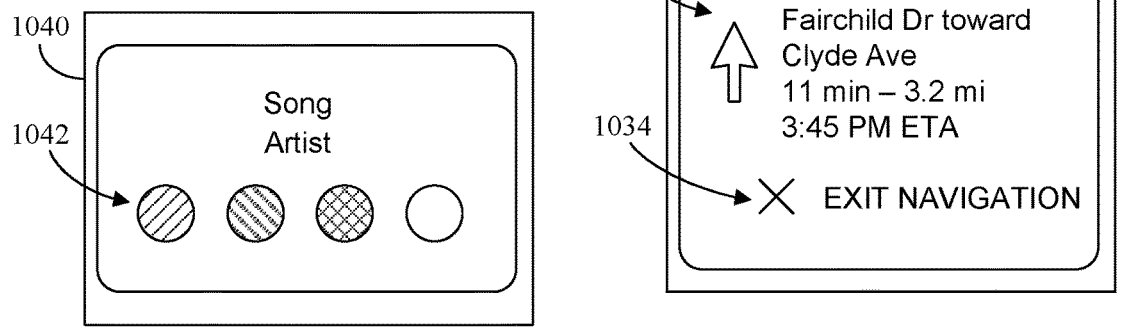
FIG. 10C
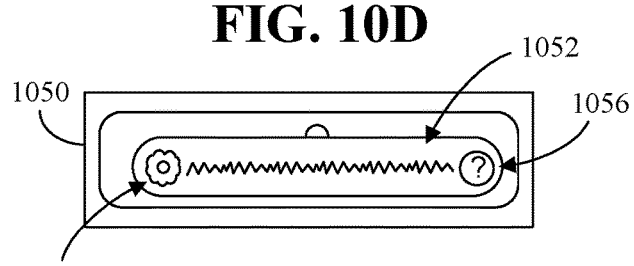
FIG. 10D
FIG. 10E

US 10,579,122 B2

DETERMINING USE CONTEXT FOR A CHARGING DEVICE AND DISPLAYING A CONTEXTUALLY APPROPRIATE USER INTERFACE

CROSS-REFERENCE TO RELATED APPLICATIONS

This application claims the benefit of U.S. Application No. 62/467,392 filed on Mar. 6, 2017, which is fully incorporated herein by reference.

TECHNICAL FIELD

This disclosure relates to devices that receive power from a charger.

BACKGROUND

The use of mobile devices, such as smart phones, smart watches, tablet computers, etc., continues to proliferate. Mobile devices require frequent charging. In this regard, most users charge their mobile devices at least once per day. Several types of chargers are commercially available for charging mobile devices. Examples of such types of chargers include wall chargers, charging stations, car chargers and wireless chargers.

SUMMARY

A method can include detecting that a device is in a power charging state. The method also can include, responsive to detecting that the device is in the power charging state, determining, using a processor, a current device use context associated with the power charging state. The method also can include selecting, using the processor, a user interface that corresponds to the current device use context associated with the power charging state. The method also can include, while the device is in the power charging state, presenting the selected user interface.

In another aspect, a method can include detecting, using a processor, a device being coupled to a charger. The method also can include communicating, using the processor, from the charger to the device data indicating a device use context associated with the charger, wherein the device determines a current device use context based on the device use context associated with the charger, the device selects a user interface that corresponds to the current device use context and, while the device is in a power charging state, the device presents the selected user interface.

A computer program product can include a computer readable storage medium having program code stored thereon, the program code executable by a processor to perform operations. The operations can include detecting that a device is in a power charging state. The operations also can include, responsive to detecting that the device is in the power charging state, determining a current device use context associated with the power charging state. The operations also can include selecting a user interface that corresponds to the current device use context associated with the power charging state. The operations also can include, while the device is in the power charging state, presenting the selected user interface.

In another aspect, a computer program product can include a computer readable storage medium having program code stored thereon, the program code executable by a processor to perform operations. The operations can include detecting a device being coupled to a charger. The operations also can include communicating from the charger to the device data indicating a device use context associated with the charger, wherein the device determines a current device use context based on the device use context associated with the charger, the device selects a user interface that corresponds to the current device use context and, while the device is in a power charging state, the device presents the selected user interface.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 10A-10E depict example user interface views presented by a user interface of a device.

DETAILED DESCRIPTION

Figure 1:
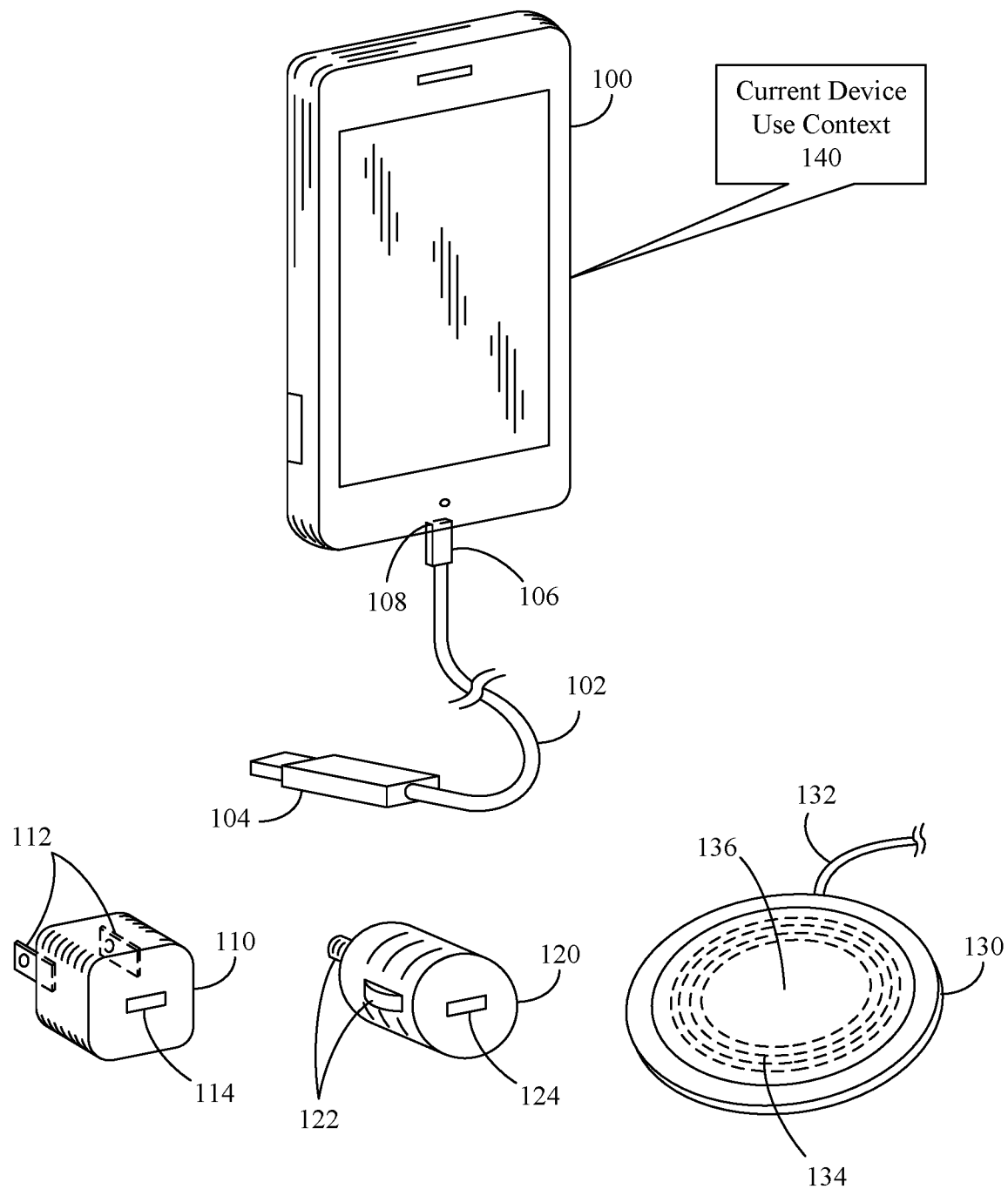
FIG. 1 is a diagram illustrating perspective views of a device and various types of chargers that may be used to charge the device.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to improving user experience with devices that receive power from a charger. Users charge their devices in different contexts, for example at home on a bedside table, at work near a laptop or desktop computer, in a vehicle, etc. In each of these contexts, users may not have easy access to various types of information and functionality. The present arrangements provide processes for a device to determine the user's context while the device is charging, to select and display a user interface appropriate to that context, and to adapt the user interface based on any additional capabilities that the charger may provide and/or based on other devices/apparatuses to which the device or charger may communicatively link.

Mobile devices, for example, often are power hungry, with the majority of users charging their mobile devices one or more times per day. Users typically charge their devices in one of three contexts: at home, at work, or in their vehicle. Devices do not, however, typically present a customized user interface to users while charging. Instead, devices typically display a conventional user interface. Since interaction is more difficult for charging devices (they are likely to be further from users, making small text harder to read, and their physical orientation may make touch interaction more difficult), the usefulness of devices while charging oftentimes is less than optimal.

Consider a user charging their mobile phone on a bedside table. It is unlikely the user will want to use the full capabilities of their mobile phone. However, the user may want to be able to quickly glance at their mobile phone to determine the current time (even when not wearing glasses) and determine whether an alarm is set. The user also may want to quickly select and control music, for instance to wind down at the end of the day, and to glance at the weather and their schedule for the upcoming day. By contrast, a user at work might want to focus on easily monitoring information. This information may be a small set of items the user wants to monitor (e.g., their next meeting, upcoming tasks, market activity, news highlights), or the desired information may be active notifications from installed applications. While driving, a user may want to minimize distractions and focus on navigating to their destination while listening to music. A user interface for that context can focus on those two primary features and provide voice interaction for other, smaller tasks the user might want to engage in, for example to enable eyes-free use.

In accordance with the inventive arrangements disclosed herein, whether a device is in a power charging state can be detected. When a device is in a power charging state, a current device use context associated with the power charging state can be determined. A user interface that corresponds to the current device use context associated with the power charging state can be selected. While the device is in the power charging state, the selected user interface can be presented to a user, for example via a display of the device.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a diagram illustrating a device 100 and various types of chargers 110, 120, 130 that may be used to charge the device 100. Examples of the device 100 include, but are not limited to, electronic devices such as a mobile phone (e.g., smart phone), a wearable computing device (e.g., smart watch, smart glasses, fitness tracker, patch, etc.), a computer (e.g., laptop computer, tablet computer, other data processing system, etc.), any of a variety of other types of mobile devices, and any suitable electronic device having a power storage (e.g., one or more batteries) capable of being charged.

The charger 110 can be a wall charger configured to be plugged into a power outlet (e.g., wall socket). For example, the charger 110 can include a plurality of terminals 112 configured to engage terminals within the power outlet, and receive power from the power outlet. The charger 110 can include electrical/electronic circuitry (e.g., a charging controller) that converts the received power to a desired output power (e.g., from 110 V/60 Hz, 220 V/50 Hz or 230 V/50 Hz to 5 VDC). The charger 110 can provide the output power to the device 100 via a port 114, for example a Universal Serial Bus (USB) port (e.g., Type A, Type B, Type C, Mini-A, Mini-B, Micro-A, Micro-B, IEEE 1394 ports, etc.) or any other connector port suitable to provide output power to a device 100.

The charger 120 can be a car charger configured to be plugged into a power outlet (e.g., cigarette lighter receptacle) of a vehicle, boat, plane, etc. For example, the charger 120 can include a plurality of terminals 122 configured to engage terminals within the power outlet. The charger 120 can include electrical/electronic circuitry (e.g., a charging controller) that converts the received power to a desired output power. The charger 120 can provide the output power to the device 100 via a port 124. The device 100 can charge its battery/batteries using the output power provided by the charger 120.

The ports 114, 124 can be, for example, communication ports, Standard Downstream Ports (SDPs), Charging Downstream Ports (CDPs), Dedicated Charging Ports (DCPs) or any other ports suitable for charging the device 100. The device 100 can charge its battery/batteries using the output power provided by the charger 110 or the charger 120 using suitable conductors/connectors, for example using a cord 102 comprising a connector 104 configured to engage the port 114 and/or the port 124 and a connector 106 configured to engage a port 108 of the device 100 that is used for charging the device 100. The cord 102 can include a plurality of conductors (not shown) that communicatively link the connector 104 to the connector 106, and thus conduct output power provided by the charger 110 or the charger 120 to the device 100.

The charger 130 can be a wireless charger. The charger 130 can include a power cord 132 configured to plug into a power outlet and receive power from the power outlet. The charger 130 can include electrical/electronic circuitry (e.g., a charging controller) that converts the received power to a desired electromagnetic signal that may couple to the device 100 to charge the device 100. In illustration, the electromagnetic signal can be a magnetic field providing inductive power transfer (IPT) using a transmitter coil 134 of the charger 130. The device 100 can charge its battery/batteries using the power generated by the magnetic field. For example, the device 100 can include a receiver coil (not shown) that magnetically couples to the transmitter coil via the magnetic field. The device 100 can charge its battery/batteries using the power provided by the magnetic field generated by the charger 130. In illustration, the device 100 can be laid onto a surface 136 of the charger 130 to initiate charging of the device 100.

Still, other types of chargers can be used to charge the device 100. For example, a charger can be a wall plate charger that is a component of a wall plate and hardwired to electrical wiring within a wall. Such a wall plate optionally may include one or more power receptacles. In another example, a charger can be an integrated charger that is integrated into a vehicle, boat, plane, etc. during manufacture of the vehicle boat or plane. In another example, a charger can be included in a docking station or a charging station, and configured to output power to the device 100 when the device is operatively connected to the docking station or charging station. In a further example, the charger can be a component of another device or apparatus. In illustration, the charger can be a component of a computer, a television, a refrigerator, a thermostat, an audio system (e.g., Bluetooth® speaker(s)), an image/video projector, etc.

As described, there are different types of chargers that can be used to charge the device 100. Moreover, a user may charge the device 100 at different times using different chargers. For example, a user may charge the device 100 using the charger 130 while the device is in the user's kitchen, using the charger 110 while the device is in the user's bedroom, using the charger 120 while the device is in the user's vehicle, using another charger configured similarly to the charger 110 or charger 130 while the device is in the user's office, and so on.

The arrangements described herein enable the device 100 to implement various operations/processes depending on a current device use context 140 associated with the current charging state. The current charging state can be determined based on the type of charger 110-130 to which the device 100 is coupled and/or determined based on the particular charger 110-130 to which the device is coupled. In illustration, responsive to the device 100 being coupled to the charger 110, the device 100 can determine a first device use context, responsive to the device 100 being coupled to the charger 120, the device 100 can determine a second device use context, responsive to the device 100 being coupled to the charger 130, the device 100 can determine a third device use context, and so on.

Figure 2:
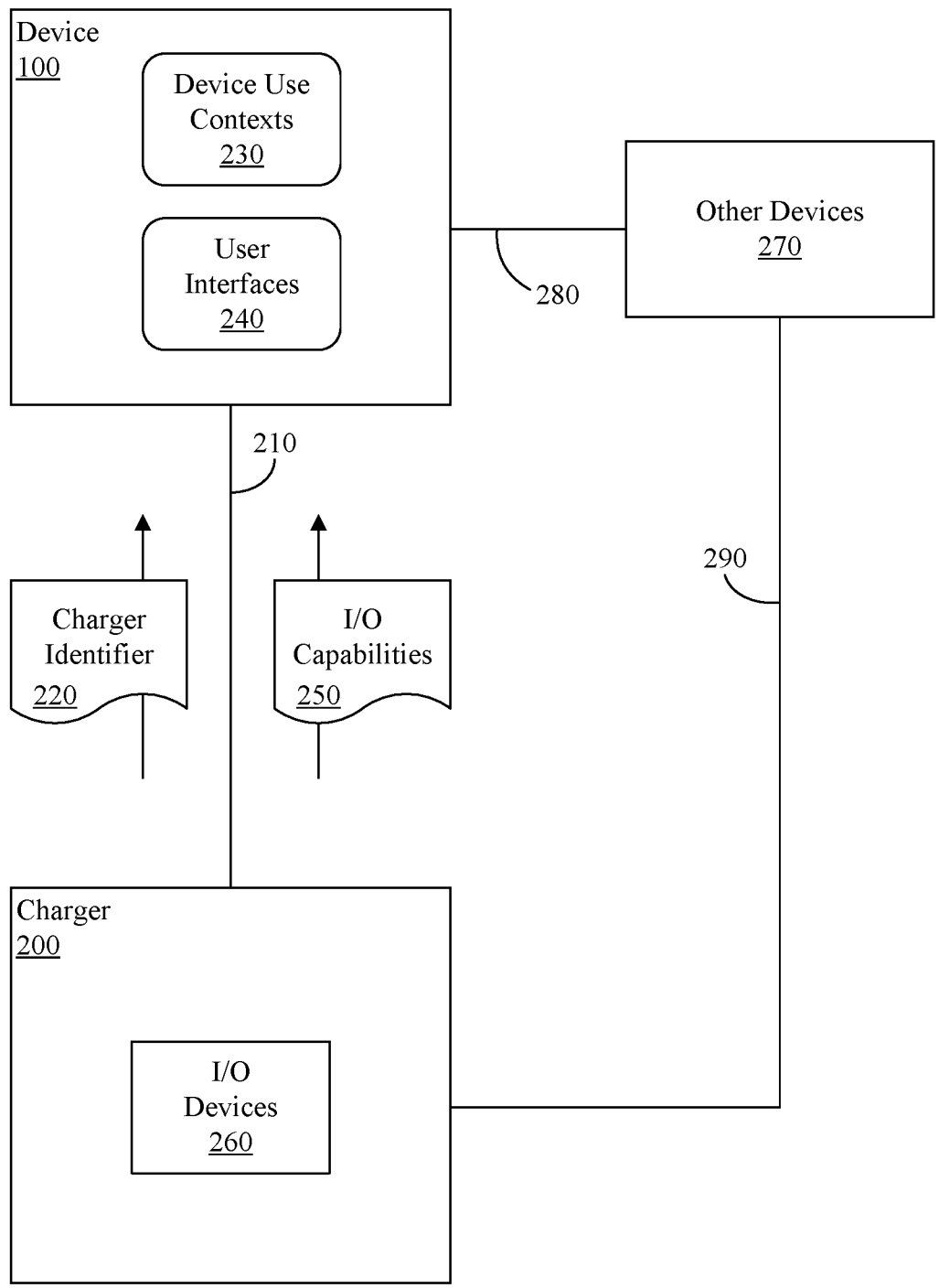
FIG. 2 is a bock diagram illustrating the device of FIG. 1 and a charger used to charge the device.

FIG. 2 is a block diagram illustrating the device 100 of FIG. 1 and a charger 200 used to charge the device 100. The charger 200 can be, for example, the charger 110, the charger 120, or the charger 130 of FIG. 1. The device 100 can be communicatively linked to the charger 200 via a link 210. The link 210 can be implemented via a cord (e.g., cord 102 of FIG. 1) connecting the device 100 to the charger 200 or via an electromagnetic field. The charger 200 can charge the device 100 (e.g., charge one or more batteries of the device 100) over the link 210.

In operation, responsive to the device 100 being communicatively linked to the charger 200 and/or the device 100 detecting power delivered over the link 210, the device 100 can determine that the device 100 is in a power charging state. Responsive to the device 100 detecting that the device 100 is in the power charging state, the device 100 can determine a device use context 230 associated with the power charging state. The device use context 230 can be determined based on which particular charger (charger 200 in this example) is being used to charge the device 100 and/or based on the type of the charger 200 being used to charge the device 100.

By way of example, responsive to the device 100 being communicatively linked to the charger 200, the charger 200 can automatically communicate to the device 100 a charger identifier 220. In illustration, the charger can communicate the charger identifier 220 to the device 100 during a hardware handshake process implemented between the device and the charger 200, for example in accordance with the USB charging protocol. In another arrangement, responsive to the device 100 being communicatively linked to the charger 200, the device 100 can communicate a request to the charger 200 requesting the charger identifier 220. In response to receiving the request, the charger 200 can communicate to the device 100 the charger identifier 220.

In one non-limiting arrangement, the charger 200 can communicate the charger identifier 220 to the device 100 using a side channel of the charging protocol being used. For example, if the charger 200 includes a Standard Downstream Port (SDP) or Charging Downstream Port (CDP), the charger identifier 220 can be communicated over a side channel of the USB charging protocol. If the charger 200 is a wireless charger, the charger identifier 220 can be communicated over a side channel of the wireless charging protocol being implemented, for example over a pulse-width modulation (PWM) channel.

The charger identifier 220 can indicate a unique identifier assigned to the charger 200 and/or a type of the charger 200. The unique identifier can be, for example, a serial number assigned to the charger 200, a media access control (MAC) address assigned to the charger 200, a unique identifier assigned to the charger 200 by a manufacturer of the charger 200 or by a user, a unique identifier assigned to a vehicle, boat or plane in which the charger 200 is integrated, or any other identifier that is unique to that particular charger 200, or unique to the vehicle, boat or plane in which the charger 200 is integrated. The type of the charger 200 can be, for example, a wall charger, a car charger, a wireless charger, a wall plate charger, a vehicle integrated charger, a boat integrated charger, a plane integrated charger, a docking station charger, a charging station charger, etc. In another example, the type of the charger 200 can be a particular make and model of the charger 200.

In a further arrangement, for example if the charger 200 includes a Dedicated Charging Port (DCP), the CDP can be configured to have a plurality of data lines (e.g., D+ and D−) shorted together. The device 100 can identify the type of the charger 200 based on detecting that the data lines are shorted together.

Responsive to receiving the charger identifier 220, the device 100 can determine (e.g., select) a device use context 230 associated with that charger identifier 220 (e.g., associated with the unique identifier assigned to the charger 200 and/or associated with the type of the charger 200), and thus associated with the current power charging state. In another arrangement, responsive to detecting the type of charger 200 in another suitable manner (e.g., detecting data lines shorted together), the device 100 can determine (e.g., select) a device use context 230 associated with that type of charger 200.

Based on the determined device use context 230, the device 100 can implement one or more operations/processes associated with (e.g., assigned to) the device use context 230. In illustration, the device 100 can select a user interface 240 that corresponds to the current device use context 230. While the device 100 is in the power charging state using the charger 200, the device 100 can display the selected user interface 240. In this regard, coupling of the device 100 to the charger 200 can trigger the device 100 to open/launch the selected user interface.

By way of example, assume the charger 200 is located in a particular room of the user's home, a second charger is located in another room of the home, a third charger is located in the user's vehicle, and a fourth charger is located at the user's place of employment. The user can assign a device use context 230 to each respective charger, or each type of charger, that may be used to charge the device 100. Further, the user can assign, to each device use context 230, a respective user interface 240.

Accordingly, while the user is charging the device 100 using the charger 200, the device 100 can present a first user interface 240. While the user is charging the device 100 using the other charger in the home, the device 100 can present a second user interface 240. While the user is charging the device 100 using the car charger, the device 100 can present a third user interface 240. While the user is charging the device 100 using a charger at the user's place of employment, the device 100 can present a fourth user interface 240.

By way of example, if the device 100 is coupled to a charger 200 located in a kitchen, the device 100 can select a custom user interface 240 that displays media controls and available or selected recipes. If the device 100 is coupled to a charger 200 located in a living room, the device 100 can select a custom user interface 240 that displays family status updates, recent pictures, and top news stories. If the device 100 is coupled to a charger 200 located in a family room where a television, audio system, etc. is located, the device 100 can select a custom user interface 240 that displays an overview of available content, shortcuts to remote controls for the television, audio system, etc., and quick access to supplementary content about currently playing media (e.g., information about a current playing movie). In another example, the charger 200 can be a component of a home's thermostat. The thermostat can enable a user to attach the device 100 to the thermostat in order to monitor and control the home's temperature via the thermostat while also charging the device. In this case, the device 100 can present a custom user interface 240 that displays the current temperature, the selected program, information about current and upcoming energy costs, suggestions for saving money, a weather forecast, SmartThings controls, etc.

As another example, the charger 200 can be a component of an appliance, for example a refrigerator, and another charger (not shown) can be a component of an oven. A user may attach a device 100 to the refrigerator to both charge their device 100 via the charger 200 and provide a custom user interface 240 for a kitchen device use context 230. In addition, the custom user interface 240 may show information and controls relevant to the refrigerator (e.g., temperature controls, an interface for adding items to a grocery shopping list, an interface for leaving messages for family members, etc.). If the user removes the device 100 from the refrigerator and attaches it to the oven, the custom user interface 240 may be changed or updated to instead show information and controls relevant to the oven (e.g., diagnostics, cook time, etc.).

In an aspect of the present arrangements, device use contexts 230 can be assigned to various chargers, and user interfaces 240 can be assigned to device use contexts 230, in a suitable manner. In illustration, responsive to the device 100 coupling to the charger 200, the device 100 can determine whether a device use context 230 is already assigned to the charger 200. If not, the device 100 can present a setup user interface (hereinafter "setup interface") via which the user can assign a device use context 230 to the charger 200. The user can select a device use context 230 from a list of device use contexts 230, or create a new device use context 230, to assign to the charger 200. In the case that a user interface 240 is not already assigned to the device use context 230, the setup interface can prompt the user to select a user interface 240 to assign to the device use context 230. In this regard, the device 100 can store, in a functional data structure (e.g., a data table) mappings of device use contexts 230 to chargers and mappings of user interfaces 240 to device use contexts 230. In another arrangement, the device 100 can store in the functional data structure a mapping of user interfaces 240 to chargers. The device 100 can access such mappings from the function data structure each time the device 100 detects that it is coupled to a charger. Accordingly, the next time the device 100 is coupled to the charger 200, the device 100 will already have a device use context 230 and/or user interface 240 associated with that charger 200. The user can access the setup interface at any time to change the device use context 230 assigned to the charger 200, change the user interface 240 assigned to the device use context 230 and/or change the user interface 240 assigned to the charger 200.

In another aspect of the present arrangements, the device 100 can determine the current device use context 230 based on any of a variety of available information. Such information can include, but is not limited to, a current time, location information (e.g., GPS data) from a location sensor (e.g., GPS receiver), movement information (e.g., accelerometer data or GPS data) from a movement sensor (e.g., accelerometer or GPS receiver), environmental information from an environmental information sensor, information indicating a current WiFi™ network that is available or to which the device 100 is connected, information indicating other devices to which the device 100 is connected or to which the device 100 can connect, etc. The device 100 can present the user interface 240 associated with the determined current device use context 230 in response to the device 100 being coupled to the charger 200 for charging. In an aspect of the present arrangements, the device 100 can automatically adjust, modify and/or change the selected user interface 240 based on the availability and/or status of other devices to which the device 100 becomes connected or to which the device 100 can connect.

By way of example, the device 100 can store various data in a functional data structure, such as a data table. Such data can include sensor data, network connectivity data, application data, metadata, etc. The device 100 can associate the data with device use contexts 230. The device 100 can access and process the data to determine a present device use context 230. In illustration, responsive to the device 100 detecting that it is in a power charging state, the device 100 can determine that GPS location data retrieved from the functional data structure indicates that the device 100 currently is located at the user's place of employment, and also determine that network connectivity data retrieved from the functional data structure indicates that the device 100 is connected to a Wi-Fi™ network at the user's place of employment. In this regard, the functional data structure can associate the specific GPS coordinates, specific Wi-Fi™ network and/or specific input/output devices available to the device 100 with the user's place of employment. Based on such determinations, the device 100 can select a device use context 230 associated with (e.g., assigned to) the user's place of employment (e.g., a device use context 230 indicating that the user is at work). The device 100 can select and present a user interface 240 assigned to that device use context 230.

In an aspect of the present arrangements, the charger 200 can determine the device use context 230 based on any of a variety of available information, and communicate the device use context 230 to the device 100. In illustration, the charger 200 can determine a device use context associated with the charger 200, and the device 100 can determine a current device use context 230 to be the device use context associated with the charger 200. The available information can include, but is not limited to, a current time, sensor data (e.g., location sensor data, movement sensor data, environmental sensor data, etc.), information indicating a current communication network (e.g., WiFi™ network or Bluetooth® network) that is available, information indicating other devices available for the device 100 to be connected, etc. The charger 200 can receive the information from one or more sensors that are components of the charger 200 and/or from one or more other devices to which the charger 200 is communicatively linked. Such other devices may, but need not, include the device 100.

In illustration, the charger 200 can identify a communication network that is currently available to the charger 200, or to which the charger 200 is communicatively linked, and determine a device use context 230 based on the identified communication network. For instance, the charger 200 can determine a device use context 230 that has been associated with (e.g., assigned to) the communication network. Further, the charger 200 can store various data in a functional data structure, such as a data table. Such data can include sensor data, network connectivity data, application data, metadata, etc. The charger 200 can associate the data with device use contexts 230. The charger 200 can access and process the data to determine a present device use context 230. For instance, responsive to the charger detecting that the device 100 is coupled to the charger 200, and thus is in a power charging state, the charger can determine that GPS location data retrieved from the functional data structure indicates that the device 100 currently is located at the user's place of employment, and also determine that network connectivity data retrieved from the functional data structure indicates that the device 100 is connected to a Wi-Fi™ network at the user's place of employment. The functional data structure can associate the specific GPS coordinates and specific Wi-Fi™ network with the user's place of employment. Based on such determinations, the charger 200 can select a device use context 230 associated with (e.g., assigned to) the user's place of employment (e.g., a device use context 230 indicating that the user is at work). The charger can communicate the device use context 230 to the device 100, and the device 100 can select and present a user interface 240 assigned to that device use context 230.

In another example, the charger 200 can determine whether the charger 200 is in a vehicle based on GPS location information, movement/acceleration data and/or whether the charger is communicatively linked to the vehicle via a Bluetooth® or WiFi™ connection. The charger 200 can determine its current location based on GPS location information. For instance, the charger 200 can compare current GPS coordinates to GPS coordinates for various locations/addresses contained in a contact list of the user or to locations/addresses indicated in a navigation/map application. Based on the determined current location, the charger can determine a device use context 230 that has been associated with (e.g., assigned to) that location.

In an aspect of the present arrangements, the charger 200 can be configured to receive user inputs, for example via one or more switches or buttons, indicating a device use context 230 to be associated with that charger 200. In illustration, the charger 200 can include one or more user controls (e.g., switches, buttons, etc.) via which the user can select a device use context from a plurality of device use contexts and set the context (e.g., bedside, living room, kitchen, office, etc.). In response to the device 100 being coupled to the charger 200, the charger 200 can communicate to the device 100 data indicating the device use context 230 associated with the charger 200. In response to receiving such data, the device 100 can select the user interface 240 corresponding to the device use context 230 associated with the charger 200, and present the selected user interface 240.

Regardless of how the charger 200 determines the current device use context 230, the charger 200 can communicate to the device 100 data indicating the current device use context 230. Accordingly, the processing to determine the device use context 230 can be offloaded to the charger 200, thus reducing the amount of processing performed by the device 100. In response to receiving such data, the device 100 can select the user interface 240 corresponding to the current device use context 230, and present the selected user interface 240.

In an aspect of the present arrangements, for example an arrangement in which the charger 200 is a component of a docking station or other apparatus/device, the device 100 can be configured to open a particular application in response to the device 100 being coupled to the charger 200. The charger 200, docking station or other apparatus/device can include a near field communication (NFC) tag that communicates to the device 100 data (e.g., an identifier) indicating the application to open. The device 100 can sense the NFC tag when coupled to the charger 200, docking station or other apparatus. In another aspect, the device 100 can include a magnetic switch that triggers (e.g., open or closes) in response to the device 100 becoming coupled to the charger 200, docking station or other apparatus/device. In response to sensing the magnetic switch being triggered, the device 100 can open an application that has been associated with the triggering of the switch.

In an aspect of the present arrangements, the charger 200 can dynamically indicate to the device 100 the presence or absence of input/output (I/O) capabilities of the charger 200 that are relevant to device use contexts 230. Such I/O capabilities can enhance the user's experience with the device 100 as part of supporting a user interface 240 based on the device use context 230. Moreover, the device 100 can determine a device use context 230 based on the I/O capabilities 250. For example, the charger 200 can communicate a listing of I/O capabilities 250 to the device 100 during a hardware handshake process between the device 100 and the charger 200. The I/O capabilities 250 can indicate, for example, whether the charger 200 includes, or is part of a device or system that includes I/O devices 260 such as a camera, a television, a projector, a lighting controller, a gesture sensor, an output audio transducer (e.g., speaker), an input audio transducer (e.g., microphone), etc. The I/O capabilities 250, or another message communicated from the charger 200 to the device 100, can indicate appropriate addresses (e.g., internet protocol (IP) addresses, media access control (MAC) addresses, personal area network (PAN) addresses, etc.) for connecting to the I/O devices, for example via Bluetooth®, WiFi™, or another suitable communication protocol. The I/O capabilities also can include instructions for connecting to the I/O device(s), which the device 100 can present via the selected user interface 240. Further, the device 100 can determine the current device use context 230 based on the availability of the I/O devices and adjust a presented user interface 240 in response to receiving the I/O capabilities 250.

In illustration, a charger 200 located at a user's bedside may include, or be a component of a device/apparatus that includes, speakers for streaming music playback, while charging the device 100 or maintaining the device's charge. The charger 200 (or device/apparatus of which the charger 200 is a component) can play the music while the user is going to sleep and play music as an alarm to wake the user. For example, the device 100 can connect to the speaker automatically and rearrange the presented user interface 240 to make access to media controls and app shortcuts more prominent. The charger 200 (or device/apparatus of which the charger 200 is a component) also can include a light controller that enables the user to control lights (e.g., control on/off and light dimming). Further, the charger 200 (or device/apparatus of which the charger 200 is a component) can include a gesture sensor (e.g., a camera and/or infrared (IR) sensor) that detects user gestures to enable the user to control music playback and lighting via non-touch user gesture events.

A charger 200 located in a user's kitchen (or device/apparatus of which the charger 200 is a component) may include a video/image projector (e.g., a short-throw video projector) that, at the behest of the user, displays content on a wall or other surface. Such charger 200 (or device/apparatus of which the charger 200 is a component) also may include speakers to allow the user to listen to music while in the kitchen.

A charger 200 located in a vehicle can communicatively link to various devices/components of the vehicle, for example to relay inputs from the device 100 to such devices/components and/or relay outputs from such devices/components to the device 100. In illustration, the charger 200 also can relay information from the device 100 to control one or more devices/apparatuses of the vehicle (e.g., to move windows up or down, relay information from the device 100 for presentation on one or more displays in the vehicle, relay information from the device 100 for presentation via the vehicle's audio system, etc. The charger 200 can relay information from the vehicle's sensors to the device 100, for example for the device 100 to display speed, odometer readings, engine sensor data, etc. The device 100 can connect to the I/O capabilities (e.g., I/O devices) it wants to use, or can use, and modify the presented user interface 240 accordingly. As another example, when coupled to a car charger that offers gesture recognition, the device 100 can connect to the charger's gesture sensor in order to receive gesture events and display information about the available gestures to the user. Further, a charger 200 can include its own processing capabilities in addition to a gesture sensor in order to perform gesture recognition for the device 100.

In an aspect of the present arrangements, I/O capabilities could be provided by other devices 270 (e.g., a camera, a television, a projector, a lighting controller, a gesture sensor, an output audio transducer, an input audio transducer, etc.) to which the device 100 may be coupled or otherwise communicatively linked via a communication link 280 (e.g., via a Bluetooth® communication link or a WiFi™ communication link). The device 100 can determine the availability and status of the devices 270 via communication link(s) 280 to the device(s) 270 and adjust the presented user interface 240 to provide information about and/or control over capabilities provided by the other devices 270. In illustration, the device 100 can detect a WiFi™ Direct accessible display (e.g., a projector or television), as well as available Bluetooth® speakers. In response to recognizing the availability of a television, the device 100 can present a user interface 240 indicating currently available content and controls for turning on the television, changing channels, etc. Further, via a communication link to the television, the device 100 can determine that the television is already displaying content. In such case, the device 100 can change/modify the user interface 240 to present content that augments content presented on the television, for example additional information or controls via which the user can explore in more detail content presented by the television. Further, via a communication link to an audio system, the device can determine that the audio system is already playing audio content. In such case, the device 100 can change/modify the user interface 240 to present content that augments the audio content being played, for example information about the artist, album and/or song currently playing. Further, the device 100 can change/modify the user interface 240 to present controls for adjusting the volume of the audio, skipping audio tracks, etc.

In the case that other devices 270 (e.g., audio system, displays, sensors, motors, etc.) in a vehicle are available to the device 100, in response to detecting such other devices 270, the device 100 can present a user interface 240 indicating currently available content and/or controls for the other devices. In response to the device 100 detecting that it is coupled to a charger 200 that is a component of a computer (e.g., a USB port), the device 100 can change/modify the user interface 240 to present content or activities that the user is engaged with on the computer. In this regard, the device 100 can act as a contextual or ambient display for the computer.

The charger 200 also can determine the availability and status of other devices 270 and communicate that information to the device 100. For example, the charger 200 can indicate to the device 100 the presence or absence of other local devices/capabilities, as well as their availability and status. In illustration, the charger 200 can dynamically detect other devices/capabilities, and determine their availability and status. During a hardware handshake process, the charger 200 can communicate to the device 100 a listing of the other local devices/capabilities that are, or may be, available to the device 100, as well as their availability and status. Further, the charger 200 can indicate appropriate addresses for connecting to the I/O devices, for example via Bluetooth®, WiFi™, or another suitable communication protocol. The device 100 can select a user interface 240 in response to receiving the indication of the other devices/capabilities. For instance, the device 100 can choose a user interface 240 from which a user can choose which of the other devices 270 the device 100 is to connect. Moreover, the device 100 can choose a user interface 240 based on which of the other devices 270 the device 100 is connected. Further, the device 100 can modify or adjust a presently displayed user interface based on the indication of the other devices/capabilities.

In an aspect of the present arrangements, the device 100 and/or the charger 200 can store various data in a functional data structure, such as a data table. Such data can include sensor data, network connectivity data, application data, data about other devices 270, metadata, etc. The device 100 and/or the charger 200 can associate the data with device use contexts 230. The device 100 and/or the charger 200 can access and process the data to determine a present device use context 230. As an example, responsive to the device 100 detecting that it is in a power charging state, the device 100 can determine that GPS location data retrieved from the functional data structure indicates that the device 100 currently is located at the user's place of employment, and also determine that network connectivity data retrieved from the functional data structure indicates that the device 100 is connected to a Wi-Fi' network at the user's place of employment. In this regard, the functional data structure can associate the specific GPS coordinates and specific Wi-Fi™ network with the user's place of employment. Based on such determinations, the device 100 can select a device use context 230 associated with (e.g., assigned to) the user's place of employment (e.g., a device use context 230 indicating that the user is at work). The device 100 can select and present a user interface 240 assigned to that device use context 230.

In an aspect of the present arrangements, the charger 200 can coordinate with other available, and possibly charging, devices 270 in order to distribute and present a suitable user interface 240 across the device 100 and the other devices 270 via a communication link 290. The user interface 240 can present information on each of the devices and provide access to actions that are available from each of the devices. For example, if a user is charging both his phone and his watch, the watch can present a summary of the most important unhandled notifications, while the phone can present more general information overviews. As another example, a charging phone and tablet might coordinate so that the tablet shows a dashboard of available information and actions, and the user can select a part of the dashboard (either on the tablet or on the phone) to see additional details on the phone.

In an aspect of the present arrangements, the device 100 can dynamically access an online service via the Internet or another suitable communication network. Using the online service, the device 100 can determine an appropriate device use context 230 and/or user interface 240 associated with the charger 200 based on the charger identifier 220 and/or I/O capabilities 250 of the charger 200 and/or other I/O devices available to the device 100. In one arrangement, if the device 100 does not already have the specified user interface installed, the device 100 can dynamically download the determined user interface 240, install the determined user interface 240 on the device 100, and present that user interface 240 responsive to the device 100 being coupled to the charger 200. This can simplify the addition of new device use contexts 230 and/or user interfaces 240 over time.

In a further example, the device 100 may not know what type of user interface 240 to present for a particular device use context 230. Via the device 100, the user can access the online service. The online service can present a listing of user interfaces and corresponding descriptions (e.g., screen shots, functionality descriptions, etc.). The user can select a user interface from the list, and associate that user interface with the current device use context 230. In response, the device 100 can download that user interface and store it as a user interface 240. The device 100 can present that user interface 240 each time the device 100 again detects the same device use context 230.

Figure 3:
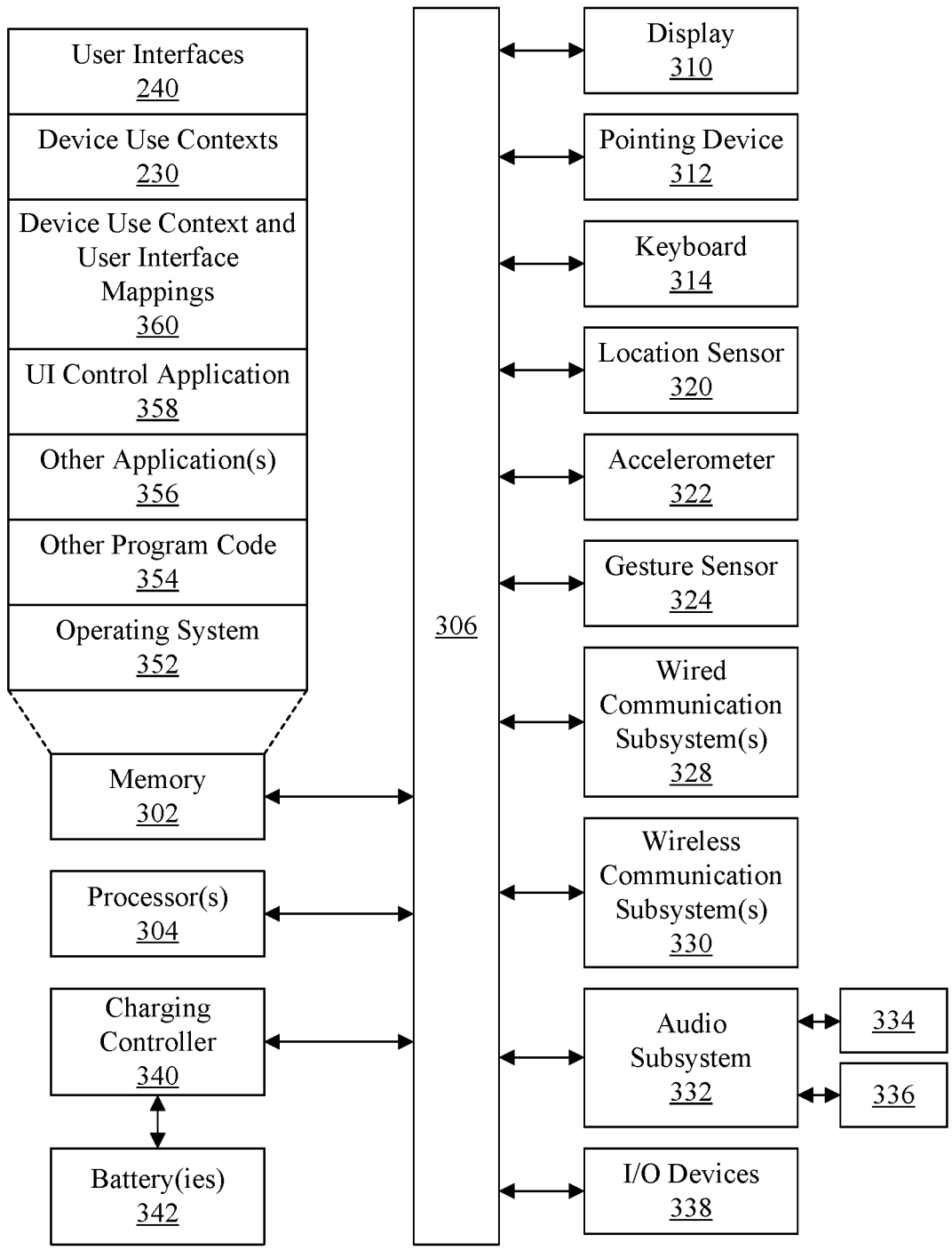
FIG. 3 is a block diagram illustrating example architecture for a device.

FIG. 3 is a block diagram illustrating an example architecture for the device 100. The device 100 can include a memory 302, one or more processors 304 (e.g., data processors, digital signal processors, etc.), and interface circuitry 306. In one aspect, the memory 302, processor(s) 304, and/or interface circuitry 306 can be implemented as separate components. In another aspect, the memory 302, processor(s) 304, and/or interface circuitry 306 can be integrated in one or more integrated circuits. The various components in the device 100, for example, can be coupled by one or more communication buses, input/output (I/O) subsystems, or signal lines (e.g., interconnects and/or wires) represented as interface circuitry 306. In one aspect, the memory 302 may be coupled to interface circuitry 306 via a memory interface (not shown).

Sensors, devices, subsystems, and/or I/O devices can be coupled to the interface circuitry 306 to facilitate the functions and/or operations described within this disclosure. The various sensors, devices, subsystems, and/or I/O devices may be coupled to the interface circuitry 306 directly, through one or more intervening I/O controllers (not shown) or through one or more communication subsystems 328, 330 (described below).

For example, a display 310 can be coupled to the interface circuitry 306. In one non-limiting arrangement, the display 310 can be a touch sensitive display (e.g., a touchscreen). A touch sensitive display is configured to detect contact, movement, breaks in contact, etc., using any of a variety of touch sensitivity technologies. Example touch sensitive technologies include, but are not limited to, capacitive, resistive, infrared, and surface acoustic wave technologies, other proximity sensor arrays or other elements for determining one or more points of contact with a touch sensitive display, etc.

Optionally, a pointing device 312 and/or a keyboard 314 (and/or keypad) can be coupled to the interface circuitry 306. Examples of a pointing device 312 include, but are not limited to, a mouse, a touchpad, trackpad, a trackball, a joystick, a stylus, etc. A touchpad or trackpad, for instance, can include any of the touch sensitive technologies described above.

Further, a location sensor 320 (e.g., a GPS receiver and/or processor) can be connected to interface circuitry 306 to provide geo-positioning sensor data. An accelerometer 322 can be connected to interface circuitry 306 to provide sensor data that can be used to determine change of speed and direction of movement of the system in 3-dimensions. A gesture sensor 324 can be connected to interface circuitry 306 to detect non-touch user gestures and generate corresponding data. The gesture sensor 324 can include, for example, a camera and/or IR sensor. The camera also can be used to capture images and/or video. The device 100 also can include any of a variety of other sensors, and the present arrangements are not limited in this regard.

Communication functions can be facilitated through one or more wired communication subsystems 328 and/or wireless communication subsystems 330. Wired communication subsystems 328 can include one or more wired network adapters. Examples of wired network adapters include, but are not limited to, modems, cable modems and Ethernet cards. Wireless communication subsystems 330 can include, but are not limited to, radio frequency receivers and transmitters, optical (e.g., infrared) receivers and transmitters, and so forth. The specific design and implementation of wireless communication subsystems 330 can depend on the particular type of the device 100 implemented and/or the communication network(s) over which the device 100 is intended to operate. For purposes of illustration, wireless communication subsystem(s) 330 may be designed to operate over one or more mobile networks, WiFi™ networks which may include WiMax network(s), personal area networks (e.g., Bluetooth® networks), and/or any combination of the foregoing.

An audio subsystem 332 can be coupled to one or more output audio transducers (e.g., speaker(s)) 334 and one or more input audio transducers (e.g., microphone(s)) 336 to facilitate voice-enabled functions, such as voice recognition, voice replication, digital recording, speech and/or audio processing, and telephony functions. The audio subsystem 332 is capable of generating and receiving audio type sensor data. The audio subsystem 332 also can be configured to output audio data to one or more audio systems external to the device 100 and/or to receive input audio data from one or more input audio devices (e.g., microphones) external to the device 100, for example via a communication port (e.g., a USB port), the wired communication subsystem(s) 328 and/or the wireless communication subsystem(s) 330. In illustration, the audio subsystem 332 can output audio data to a Bluetooth® speaker or vehicle audio system via the wireless communication subsystem(s) 330 and/or receive input audio data from a Bluetooth® microphone or a microphone integrated into a vehicle. Further, the audio subsystem 332 can output audio data to, and receive input audio data from, a charger to which the device 100 is coupled, for example while charging.

Additional I/O devices 338 can be coupled to interface circuitry 306. Examples of I/O devices 338 can include, but are not limited to, communication ports (e.g., USB ports, IEEE 1394 ports, parallel ports, serial ports, etc.), buttons or other physical controls, and so forth.

The device 100 further includes a charging controller 340. The charging controller 340 can receive power from a charger and use the power to charge one or more batteries 342 of the device 100. By way of example, the charging controller 340 can receive power from the charger via a USB port, a dedicated power charging port and/or a receiver coil that magnetically couples to a transmitter coil of a charger. In the case that the received power is alternating current (AC), the charging controller 340 can rectify the received power to generate direct current (DC). Further, the charging controller 340 can implement voltage and/or current regulation on the received power to generate charging power to charge the battery/batteries 342. The charging controller 340 and battery/batteries 342 can be components of a power system for the device 100 that is capable of providing electrical power to the various elements of the device 100. The battery/batteries 342 may be implemented using any of a variety of different rechargeable battery technologies.

The memory 302 can include random access memory (e.g., volatile memory) and/or non-volatile memory, such as one or more magnetic disk storage devices, one or more optical storage devices, flash memory, etc. The memory 302 can store operating system 352, such as LINUX, UNIX, a mobile operating system (e.g., Android™), an embedded operating system, etc. The operating system 352 may include instructions for handling system services and for performing hardware dependent tasks.

The memory 302 may also store other program code 354. Examples of other program code 354 may include instructions that facilitate communicating with one or more additional devices, one or more computers and/or one or more servers; graphic user interface operations; sensor-related operations; phone-related operations; electronic-messaging related operations; Web browsing-related operations; media processing-related operations; GPS and navigation-related operations; security operations; camera-related operations including Web camera and/or Web video operations; and so forth. The memory 302 may also store one or more other application(s) 356.

The memory 302 may store a user interface (UI) control application 358. The UI control application 358 can detect the device 100 being coupled to a charger and in a charging state, determine a current device use context associated with the power charging state, select a user interface that corresponds to the current device use context associated with the power charging state, and interface with the operating system 352 to present the user interface, for example on the display 310. In illustration, the UI control application 358 can determine the device use context based on a charger identifier received from the charger, for example as previously described. The UI control application 358 also can receive data regarding I/O capabilities from the charger. As noted, such data can indicate I/O capabilities/devices of the charger (or a device/apparatus of which the charger is a component) and/or I/O capabilities of other devices to which the charger and/or the device can be communicatively linked. The UI control application 358 can select, change and/or modify user interfaces presented by the device 100 based on the charger identifier, the I/O capabilities and/or coupling of the device 100 to one or more other devices/apparatuses. Further aspects of operations performed through execution of UI control application 358 are described herein with reference to the processes performed by the device 100 as described for FIG. 2 and with reference to the remaining figures.

The memory 302 also may store device use context and user interface mappings 360 in a functional data structure, such as a data table. The mappings 360 can include, for example, mappings of device use contexts 230 to chargers and mappings of user interfaces 240 to device use contexts 230, such as those previously described with reference to FIG. 2. The memory 302 also may store the device use contexts 230 and user interfaces 240 described with reference to FIG. 2.

The various types of instructions and/or program code described are provided for purposes of illustration and not limitation. The program code may be implemented as separate software programs, procedures, or modules. The memory 302 can include additional instructions or fewer instructions. Furthermore, various functions of the device 100 may be implemented in hardware and/or in software, including in one or more signal processing and/or application specific integrated circuits.

Program code stored within the memory 302 and any data items used, generated, and/or operated upon by the device 100 are functional data structures that impart functionality when employed as part of the system. Further examples of functional data structures include, but are not limited to, sensor data, data obtained via user input, data obtained via querying external data sources, internal data, and so forth. The term "data structure" refers to a physical implementation of a data model's organization of data within a physical memory. As such, a data structure is formed of specific electrical or magnetic structural elements in a memory. A data structure imposes physical organization on the data stored in the memory as used by a processor.

In one or more embodiments, one or more of the various I/O devices, sensors and/or subsystems described with reference to the device 100 may be separate devices that are coupled or communicatively linked to the device 100 through wired or wireless connections. For example, one or more, or all, of display 310, pointing device 312, keyboard 314, location sensor 320, accelerometer 322, gesture sensor 324, audio subsystem 332, and so forth may be implemented as separate systems or subsystems that couple to the device 100 by way of I/O devices 338 and/or wireless communication subsystem(s) 330.

The device 100 may include fewer components than shown or additional components not illustrated in FIG. 3 depending upon the particular type of device that is implemented. In addition, the particular operating system and/or application(s) and/or other program code included may also vary according to type of device. Further, one or more of the illustrative components may be incorporated into, or otherwise form a portion of, another component. For example, a processor may include at least some memory.

The device 100 is provided for purposes of illustration and not limitation. A device configured to perform the operations described herein may have a different architecture than illustrated in FIG. 3. The architecture may be a simplified version of the architecture described in connection with the device 100 and include a processor and memory storing instructions. The architecture may include one or more sensors or subsets of sensors as described herein. The device 100, or a device similar to the device 100, is capable of collecting sensor data using the various sensors of the device or sensors coupled thereto. It should be appreciated, however, that the device 100 may include fewer sensors or additional sensors. Within this disclosure, data generated by a sensor is called "sensor data."

Figure 4:
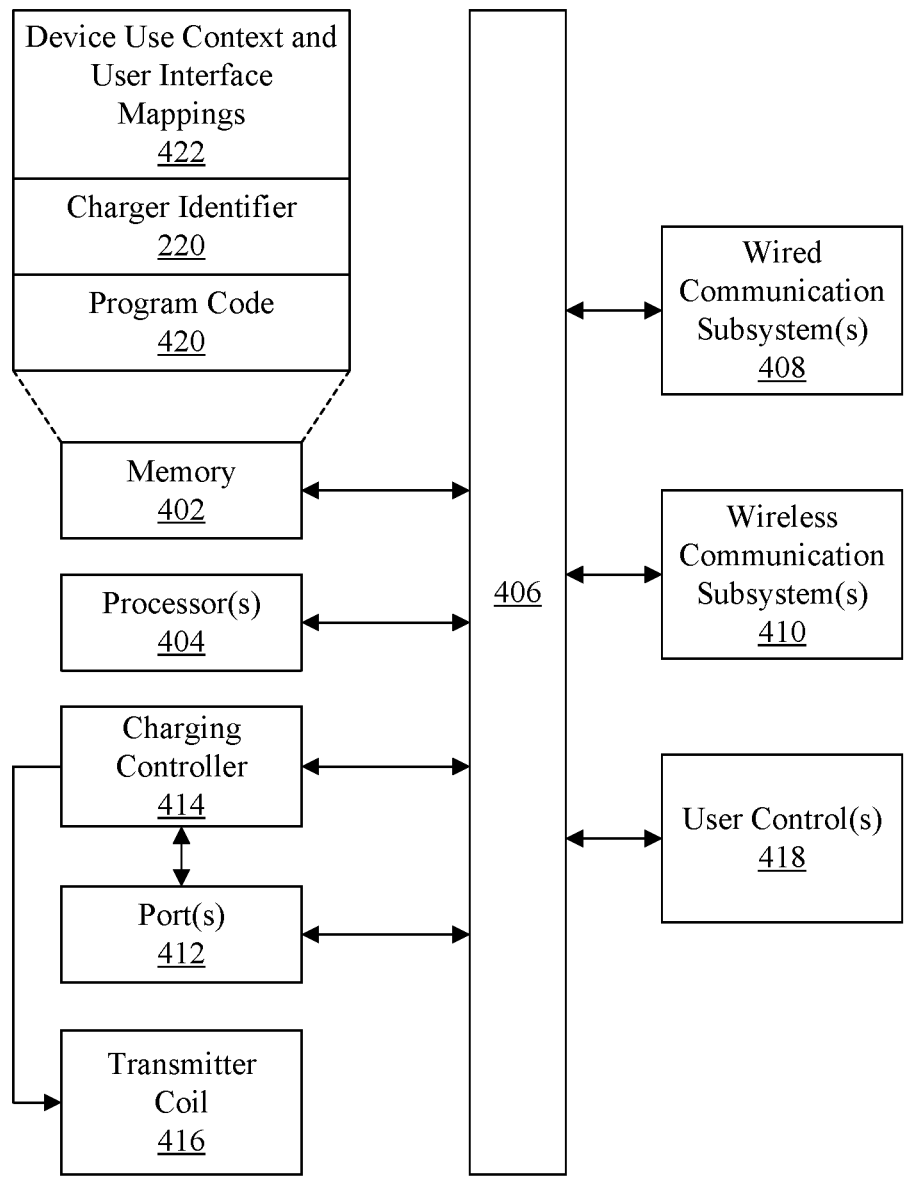
FIG. 4 is a block diagram illustrating example architecture for a charger.

FIG. 4 is a block diagram illustrating example architecture for the charger 200. The charger 200 can include a memory 402, one or more processors 404 (e.g., data processors, digital signal processors, etc.), and interface circuitry 406. In one aspect, the memory 402, processor(s) 404, and/or interface circuitry 406 can be implemented as separate components. In another aspect, the memory 402, processor(s) 404, and/or interface circuitry 406 can be integrated in one or more integrated circuits. The various components in the charger 200, for example, can be coupled by one or more communication buses, input/output (I/O) subsystems, or signal lines (e.g., interconnects and/or wires) represented as interface circuitry 406. In one aspect, the memory 402 may be coupled to interface circuitry 406 via a memory interface (not shown).

Optionally, sensors, devices, subsystems, and/or I/O devices can be coupled to the interface circuitry 406 to facilitate the functions and/or operations described within this disclosure. The various sensors, devices, subsystems, and/or I/O devices may be coupled to the interface circuitry 406 directly, through one or more intervening I/O controllers (not shown), or through one or more communication subsystems 408, 410.

Communication functions can be facilitated through one or more wired communication subsystems 408 and/or wireless communication subsystems 410. Wired communication subsystems 408 can include one or more wired network adapters. Examples of wired network adapters include, but are not limited to, modems, cable modems and Ethernet cards. Wireless communication subsystems 410 can include, but are not limited to, radio frequency receivers and transmitters, optical (e.g., infrared) receivers and transmitters, and so forth. The specific design and implementation of wireless communication subsystems 410 can depend on the particular type of the charger 200 implemented and/or the communication network(s) over which the charger 200 is intended to operate. For purposes of illustration, wireless communication subsystem(s) 410 may be designed to operate over one or more mobile networks, WiFi™ networks which may include WiMax network(s), personal area networks (e.g., Bluetooth® networks), and/or any combination of the foregoing.

Additional I/O devices can be coupled to interface circuitry 406. Examples of I/O devices can include, but are not limited to, ports 412. A port 412 can be, for example, a communication port, a Standard Downstream Port (SDP), a Charging Downstream Port (CDP), a Dedicated Charging Port (DCP) or any other port suitable for charging a device (e.g., a USB port, an IEEE 1394 port, etc.).

The charger 200 further can include a charging controller 414. The charging controller 414 can receive power from a power source (e.g., a power outlet, a vehicle, etc) and convert the received power to a desired output voltage and/or electromagnetic signal that may couple to a device to charge the device. For example, the charging controller 414 can provide the output voltage via the port(s) 412 and/or provide an electromagnetic signal via a transmitter coil 416, for example as described with reference to FIG. 1.

Optionally, the charger 200 can include one or more user controls 418. The user control(s) 418 can include, for example, one or more buttons, switches, etc. Via the user control(s) 418, a user can assign a device use context to the charger 200. For example, in response to receiving one or more user inputs via the user control(s) 418, the processor 404 can select a device use context for the charger 200 and store the selection in the memory 402. In another example, the processor 404 can determine the state(s) of the user control(s) 418 when a device is coupled to the charger 200, and determine the device use context based on those state(s). In a further example, a user can assign the device use context and/or a unique identifier to the charger 200 via a device that is coupled to the charger 200. For example, the device can present a user interface via which the user can assign the device use context and/or unique identifier to the charger 200. The device can communicate such assignment to the processor 404, and the processor can store the assigned device use context and/or unique identifier to the memory 402. For example, the processor 404 can store the unique identifier as the charger identifier 220 and/or store the device use context in the device use context and user interface mappings 422.

The memory 402 can include random access memory (e.g., volatile memory) and/or non-volatile memory, such as one or more magnetic disk storage devices, one or more optical storage devices, flash memory, etc. The memory 402 can store program code 420, which may include instructions for performing processes and tasks described herein as being performed by the charger 200 (e.g., charger 110, charger 120 and/or charger 130 of FIG. 1). The memory 402 may also store the charger identifier 220. The charging controller 414 can communicate the charger identifier 220 to the device in response to the device being coupled to the charger 200 via the port(s) 412 and/or transmitter coil 416, for example as previously described with reference to FIGS. 1 and 2.

Optionally, the memory 402 can store device use context and user interface mappings 422 in a functional data structure, such as a data table. The mappings 422 can include, for example, mappings of device use contexts 230 to the charger 200 and mappings of user interfaces 240 to device use contexts 230, such as those previously described with reference to FIG. 2. Further, the charging controller 414 can perform various processes using the device use context and user interface mappings 422, for example as previously described with reference to FIG. 2.

The various types of instructions and/or program code described are provided for purposes of illustration and not limitation. The program code may be implemented as separate software programs, procedures, or modules. The memory 402 can include additional instructions or fewer instructions. Furthermore, various functions of the charger 200 may be implemented in hardware and/or in software, including in one or more signal processing and/or application specific integrated circuits.

Program code stored within the memory 402 and any data items used, generated, and/or operated upon by the charger 200 are functional data structures that impart functionality when employed as part of the system. Further examples of functional data structures include, but are not limited to, sensor data, data obtained via user input, data obtained via querying external data sources, internal data, and so forth. The term "data structure" refers to a physical implementation of a data model's organization of data within a physical memory. As such, a data structure is formed of specific electrical or magnetic structural elements in a memory. A data structure imposes physical organization on the data stored in the memory as used by a processor.

In one or more embodiments, one or more of the various I/O devices, sensors and/or subsystems described with reference to the charger 200 may be separate devices that are coupled or communicatively linked to the charger 200 through wired or wireless connections. The charger 200 may include fewer components than shown or additional components not illustrated in FIG. 4 depending upon the particular type of device that is implemented. In addition, the particular other program code included may also vary according to a type of the charger 200. Further, one or more of the illustrative components may be incorporated into, or otherwise form a portion of, another component. For example, a processor may include at least some memory.

The charger 200 is provided for purposes of illustration and not limitation. A charger configured to perform the operations described herein may have a different architecture than illustrated in FIG. 4. The architecture may be a simplified version of the architecture described in connection with the charger 200 and include a processor and memory storing instructions. The architecture may include one or more sensors or subsets of sensors (not shown). The charger 200, or a device similar to the charger 200, is capable of collecting sensor data using the various sensors of the charger or sensors coupled thereto, and processing such sensor data as described herein.

Figure 5:
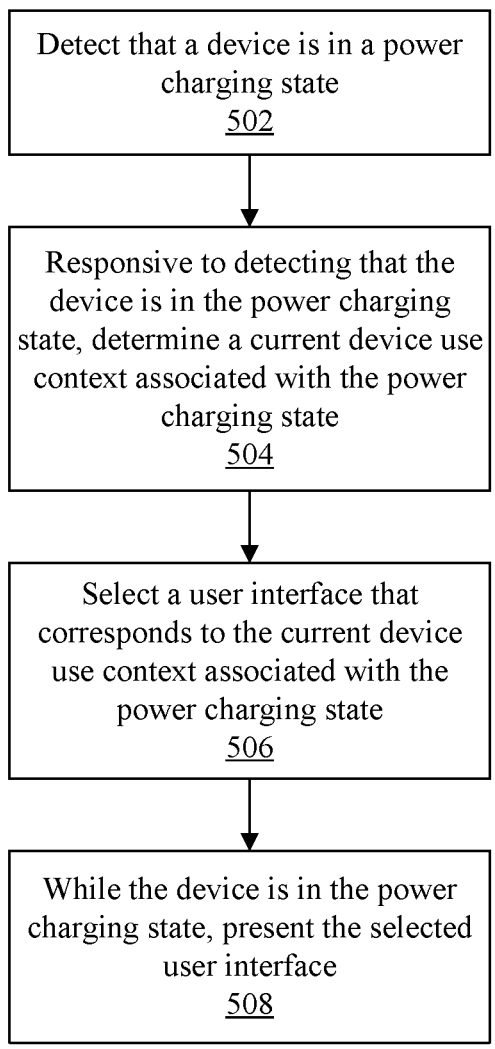
FIG. 5 is a flowchart illustrating an example of a method of displaying a selected user interface based on a current device use context.

FIG. 5 is a flowchart illustrating an example of a method 500 of displaying a selected user interface based on a current device use context. At step 502, a device 100 can detect that the device 100 is in a power charging state. For example, the device 100 can detect that the device 100 is coupled to a charger 200. At step 504, responsive to detecting that the device 100 is in the power charging state, the device 100 can determine, in real time, a current device use context associated with the power charging state. At step 506, the device 100 can select, in real time, a user interface that corresponds to the current device use context associated with the power charging state. For example, the device 100 can access a functional data structure that maps device use contexts to user interfaces, and select from the functional data structure a user interface that is mapped to the determined current device use context.

At step 508, while the device 100 is in the power charging state, the device 100 can present the selected user interface. The user interface can present a set of device features via at least one view of the user interface. The set of device features can be device features pertinent to (e.g., selected for), the current device use context. In illustration, if the current device use context is determined to be a first device use context, the user interface can present, via a first user interface view, a first set of device features. If, however, the current device use context is determined to be a second device use context distinct from the first device use context, the user interface can present, via a second user interface view, a second set of features. The second user interface view can be at least partially distinct from the first user interface view. Further, the second set of features can be at least partially distinct from the first set of features. The device features can include functions and/or applications available to the user, and/or information presented to the user.

Figure 6:
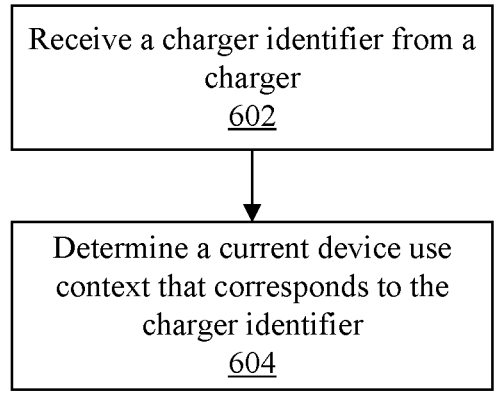
FIG. 6 is a flowchart illustrating an example of a method of determining a current device use context.

FIG. 6 is a flowchart illustrating an example of a method 600 of determining a current device use context. The method 600 can be implemented at step 504 of FIG. 5. At step 602, the device 100 can receive a charger identifier from a charger 200. As noted, the charger identifier can indicate a unique identifier assigned to the charger and/or a type of the charger 200. At step 604, the device 100 can determine a current device use context that corresponds to the charger identifier. For example, the device 100 can access a functional data structure that maps device use contexts to charger identifiers, and select from the functional data structure a device use context that is mapped to the charger identifier.

In another arrangement, rather than performing steps 602 and 604, a device use context can be assigned to the charger 200, for example as previously described. For example, the device 100 can receive from the charger 200 data indicating a device use context associated with the charger 200, and determine the current device use context based on the device use context associated with the charger 200. In illustration, the device 100 can determine the current device use context to be the device use context associated with the charger 200.

Further, the charger 200 can determine the device use context based on sensor data received from one or more sensors, and indicate the device use context to the device 100. For instance, the charger 200 can receive location data from a sensor of the charger 200 or a sensor to which the charger 200 is communicatively linked, and determine a location and/or movement of the charger 200 based on the sensor data. Based on the determined location and/or movement, the charger 200 can determine the current device use context, for example as previously described. Responsive to the device 100 coupling to the charger 200, for example to initiate charging of the device 100, the charger 200 can communicate to the device 100 an indication of the device use context assigned to the charger 200, and the device 100 can determine that device use context to be the current device use context.

Figure 7:
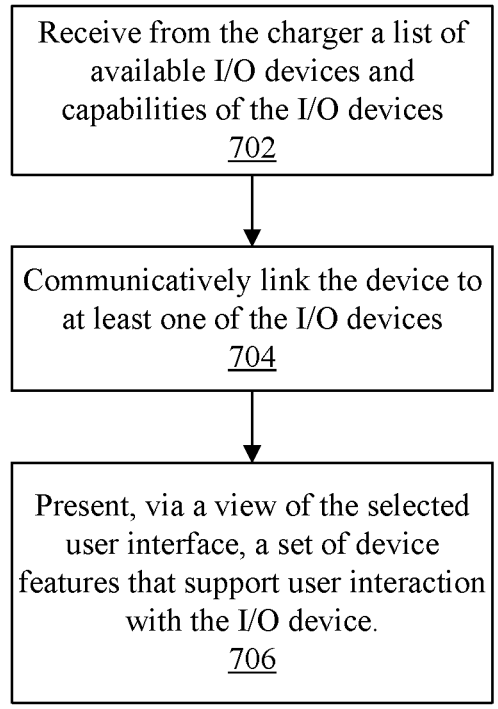
FIG. 7 is a flowchart illustrating an example of a method of presenting a view with which a user may interact to use an I/O device.

FIG. 7 is a flowchart illustrating an example of a method 700 of presenting a view with which a user may interact to use an I/O device. At step 702, the device 100 can receive from the charger 200 a list of available I/O devices and capabilities of the I/O devices. The list can include addresses of the I/O devices, which the device 100 can use to communicatively link to the I/O devices. At step 704, the device 100 can communicatively link to at least one of the I/O devices. At step 706, responsive to linking to the I/O device(s), the device 100 can present via a view of the selected user interface (selected at step 508 of FIG. 5), a set of device features that support user interaction with the I/O device(s). The user may interact with the user interface view to use the I/O device(s).

Figure 8:
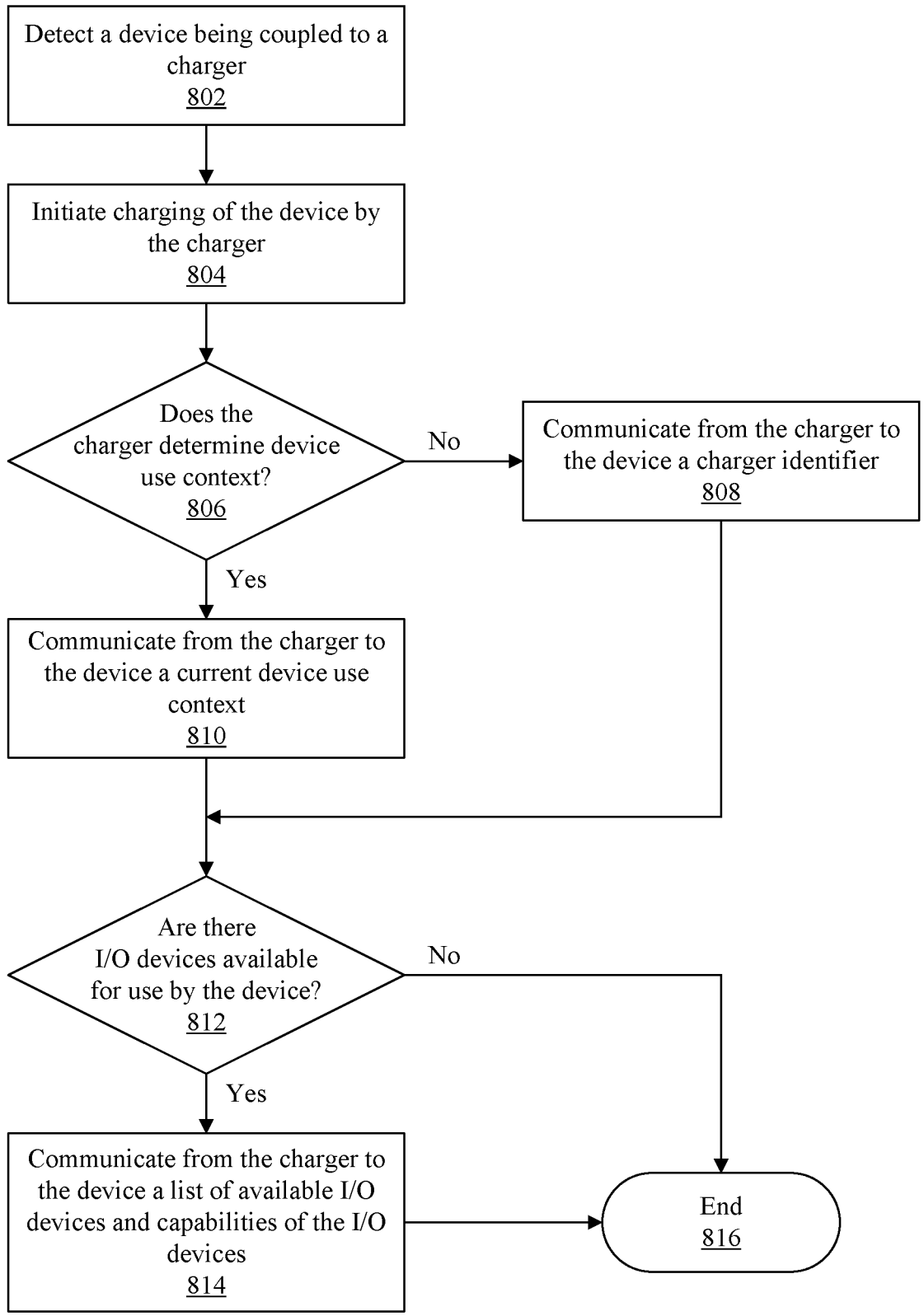
FIG. 8 is a flowchart illustrating an example of a method of communicating information from a charger to a device.

FIG. 8 is a flowchart illustrating an example of a method 800 of communicating information from a charger 200 to a device 100. At step 802, a charger 200 can detect a device 100 being coupled to the charger 200, for example to initiate a power charging state on the device 100. At step 804, the charger 200 can initiate charging of the device 100 by the charger 200. In illustration, the charger 200 can provide power to the device 100 to charge one or more batteries. Referring to decision box 806, if the charger 200 does not determine device use context, at step 808 the charger 200 can communicate, from the charger 200 to the device 100, a charger identifier. As noted, the charger identifier can indicate a unique identifier assigned to the charger 200 and/or a type of the charger 200. If the charger 200 does determine device use context, at step 810 the charger 200 can communicate, from the charger 200 to the device 100, a current device use context. The current device use context can be a device use context assigned to the charger 200, for example as previously described.

Referring to decision box 812, the charger 200 can determine whether there are I/O devices available for use by the device 100. If so, at step 814 the charger 200 can communicate, from the charger 200 to the device 100, a list of available I/O devices and capabilities of the I/O devices. The list can include addresses of the I/O devices, which the device 100 can use to communicatively link to the I/O devices. The process can end at step 816.

FIGS. 9A-9F depict example user interface views presented by a user interface of a device 100 (FIGS. 1-3). In the examples of FIGS. 9A-9F, the user interface can be selected for a bedside device use context.

Figure 9A:
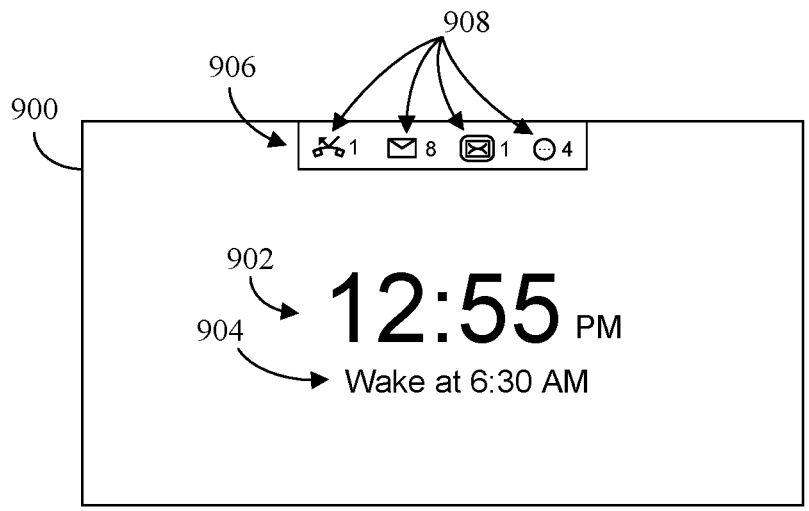
FIGS. 9A-9F depict example user interface views presented by a user interface of a device.

FIG. 9A depicts an example default view 900 for the bedside device use context. The view 900 can present a set of device features of the device 100. For example, the view 900 can present a current time 902 and information 904 indicating a scheduled time for an alarm of the device. The view 900 also can present a brief overview 906 of primary notification categories. The overview 906 can indicate, for example, a number of missed calls, a number of unread emails, a number of unread text messages, and a number of other unread notifications. For privacy purposes, the brief overview need not indicate further information, such as names of callers/caller IDs, content of the unread emails, text messages, notifications, etc. Nonetheless, the user can select respective icons 908 presented in the overview 906 to access such further information, or initiate presentation of another view to access the further information.

Figure 9B:
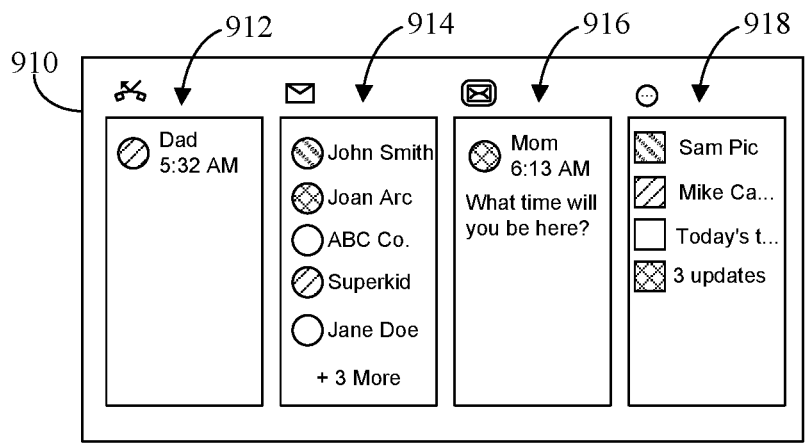

FIG. 9B depicts another example view 910. The user can access the view 910 by providing a user input gesture to the device 100, for example by swiping down on a touchscreen presenting the view 900 or providing a hand movement near the touchscreen, or by providing a voice command to the device 100. The view 910 can provide another set of device features of the device 100. For example, the view 910 can provide further information 912 related to missed calls, further information 914 related to unread emails, further information 916 related to unread text messages and further information 918 related to other unread notifications.

Figure 9C:
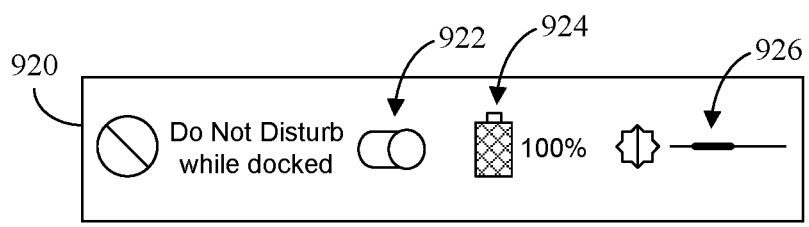

FIG. 9C depicts another example view 920. The user can access the view 920 by providing a user input gesture to the device 100, for example by swiping up on a touchscreen presenting the view 900 or providing a hand movement near the touchscreen, or by providing a voice command to the device 100. The view 920 can present another set of device features of the device 100. For example, the view 920 can present a control 922 (e.g., button or slider) which the user can select to enter the device 100 into a do not disturb setting, or deselect to remove the device 100 from the do not disturb setting. The view 920 also can present an icon 924 and/or text indicating a charge level of a battery of the device 100, and a control 926 (e.g., slider) which the user can adjust to adjust a brightness setting of the device's display.

Figure 9D:
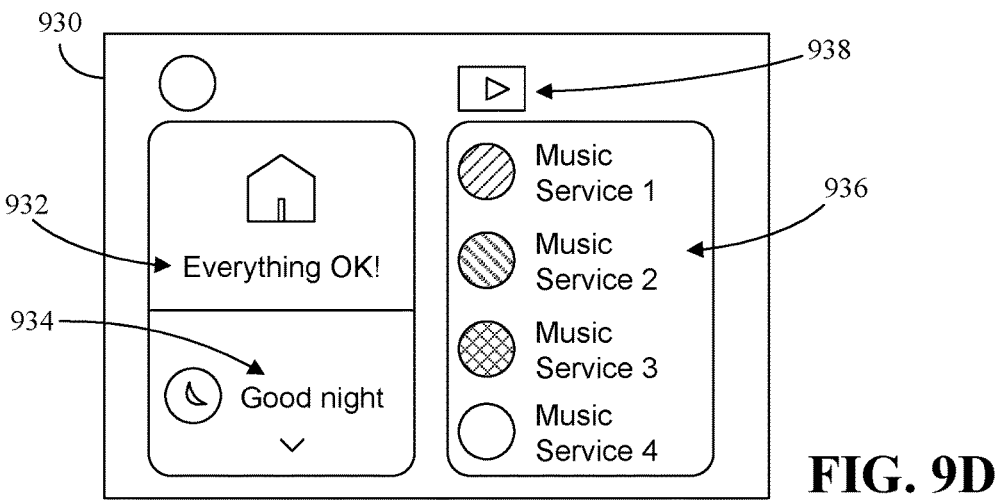

FIG. 9D depicts another example view 930. The user can access the view 930 by providing a user input gesture to the device 100, for example by swiping left on a touchscreen presenting the view 900 or providing a hand movement near the touchscreen, or by providing a voice command to the device 100. The view 930 can present another set of device features of the device 100. For example, the view 930 can present one or more status indicators, such as a home alarm status indicator 932 and a nighttime status indicator 934. The view 930 also can present a list 936 of available music services (or other content services) from which the user can select a particular service, and a control 938 (e.g., button) the user can select to initiate the selected service to begin playing music (or other content). The view also can include additional controls (not shown) for controlling music/content playback volume, etc.

Figure 9E:
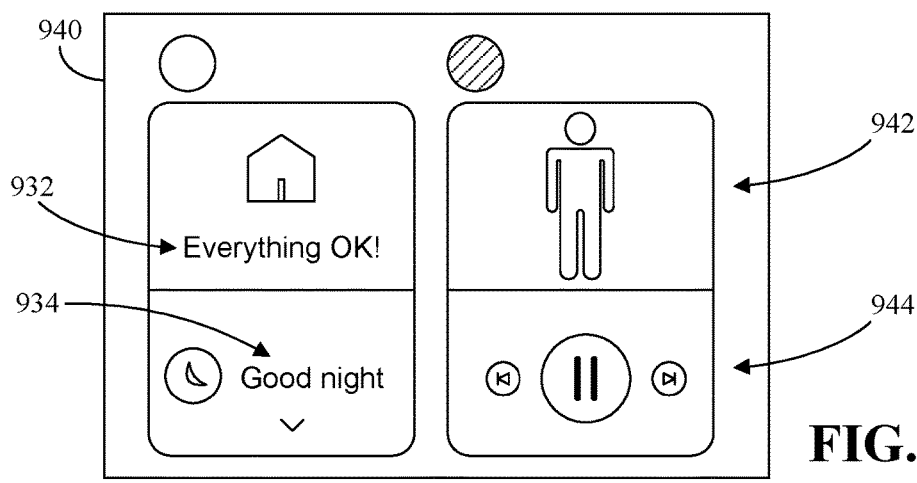

FIG. 9E depicts another example view 940. The view 940 can be an updated/modified version of the view 930, though this need not be the case. For example, the device 100 can update the view 930 to the view 940 in response to the user selecting the control 938 of FIG. 9D. In the view 940, the device 100 can present the home alarm status indicator 932 and nighttime status indicator 934, but can replace the list 936 of available music services and the control 938 (FIG. 9D) with an indicator 942 presenting information about the selected music service and/or information about a song presently being played by the music service (e.g., an image of an album cover, a name of the artist, a title of the song, etc.). Further, the view 940 can present controls 944 for controlling the music service, for example a pause/play button, a button to skip to the beginning of a song or to skip to a previous song, and a button to skip to a next song.

Figure 9F:
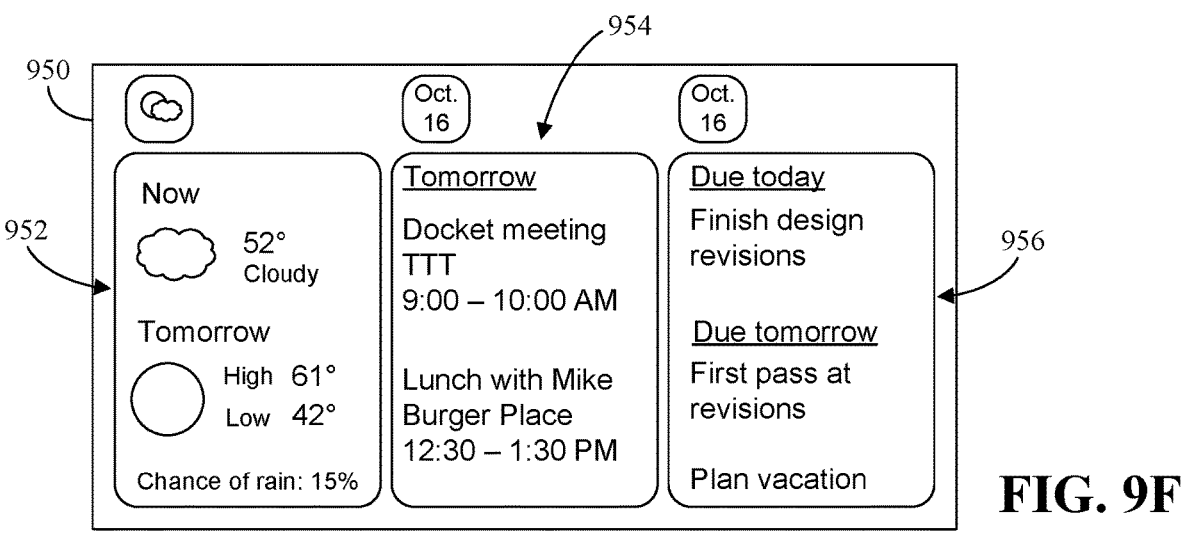

FIG. 9F depicts another example view 950. The user can access the view 950 by providing a user input gesture to the device 100, for example by swiping right on a touchscreen presenting the view 900 or providing a hand movement near the touchscreen, or by providing a voice command to the device 100. The view 950 can present another set of device features of the device 100. For example, the view 950 can present weather information 952, information 954 regarding schedule meetings, and information 956 regarding scheduled tasks.

FIGS. 10A-10E depict example user interface views presented by a user interface of a device. In the examples of FIGS. 10A-10E, the user interface can be selected for a vehicle device use context.

FIG. 10A depicts an example default view 1000 for the vehicle device use context. The view 1000 can present a set of device features of the device 100. For example, the view 1000 can present navigation information 1002. The navigation information 1002 can include icons 1004 the user can select to provide navigation instructions to locations associated with the icons 1004. The navigation information 1002 also can include a control 1006 selectable by the user to present additional navigation information.

The view 1000 also can present call information 1008, for example information indicating a present or recent call, a contact with whom the call is being conducted or was conducted, and a status of the call. The view also can present music playback information 1010. The music playback information 1010 can include information 1012 about a song presently being played by the device 100 and controls 1014 for controlling the music playback. The view 1000 also can include a voice command control 1016 selectable by the user to initiate the device 100 to receive and process voice commands.

FIG. 10B depicts another example view 1020. The user can access the view 1020 by providing a user input gesture to the device 100, for example by selecting the control 1006 of FIG. 10A. The view 1020 can present the icons 1004. The view 1020 also can present further navigation information, for example an icon 1022 to resume navigation, an icon 1024 to view recent navigation history, etc. The view 1020 also can present user selectable icons 1026 the user can select to launch applications represented by the icons 1026.

FIG. 10C depicts another example view 1030. The user can access the view 1030 by providing a user input gesture to the device 100, for example by selecting an icon 1004 (FIG. 10A or FIG. 10B) or by selecting an icon 1022, 1024 (FIG. 10B). The view 1030 can present navigation directions 1032, as well as a control 1034 selectable by the user to exit the view 1030 and return to a previously presented view.

FIG. 10D depicts another example view 1040. The user can access the view 1040 by providing a user input gesture to the device 100, for example by selecting a region of the music playback information 1010 (FIG. 10A). The view 1040 can present controls/icons for accessing music services (e.g., to change music playback from one music service to another), controls for controlling music playback, etc. In one arrangement, the controls 1042 can replace the controls 1014 of FIG. 10A in the view 1000 responsive to the playback information 1010 being selected. The user can select a user control (not shown) to revert back to the playback information 1010.

FIG. 10E depicts another example view 1050. The user can access the view 1050 by providing a user input gesture to the device 100, for example by selecting the voice command control 1016 (FIG. 10A). The view 1050 can present an indicator 1052 indicating that voice commands are being received by the device 100 and processed. Further, the view 1050 can present a user selectable icon/button 1054 the user can select to access a voice command settings menu and a user selectable icon/button 1056 the user can select to access a voice command help menu. In one arrangement, the indicator 1052 and icons/buttons 1054, 1056 can be presented over the voice command control 1016 in the view 1000 of FIG. 10A.

FIGS. 11A-11G depict example user interface views presented by a user interface of a device. In the examples of FIGS. 11A-11G, the user interface can be selected for a workplace device use context.

Figure 11A:
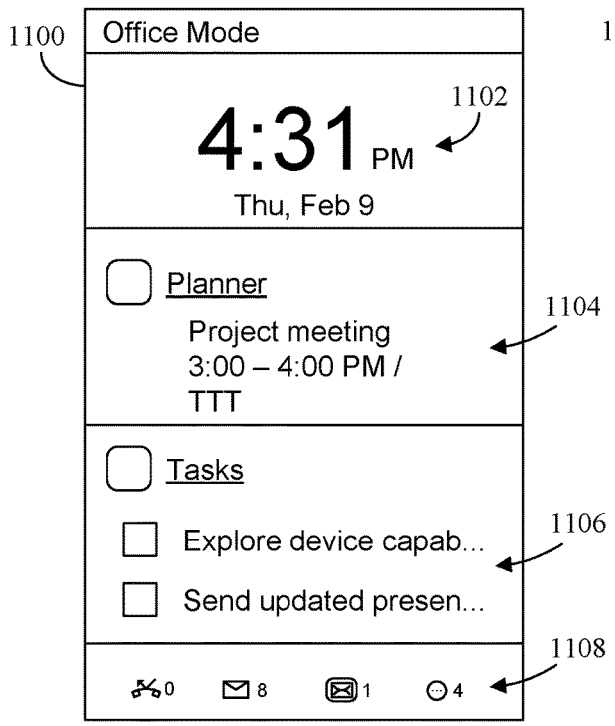
FIGS. 11A-11G depict example user interface views presented by a user interface. of a device.

FIG. 11A depicts an example default view 1100 for the workplace device use context. The view 1100 can present a set of device features of the device 100. For example, the view 1100 can present a current time/date 1102, one or more scheduled meetings 1104 and one or more scheduled tasks 1106. The scheduled meetings 1104 and scheduled tasks 1106 can be presented as active cards with which the user can interact. Further, the view 1100 can present a brief overview 1108 of primary notification categories. The overview 1108 can indicate, for example, a number of missed calls, a number of unread emails, a number of unread text messages, and a number of other unread notifications. As noted, for privacy purposes, the brief overview need not indicate further information, such as names of callers/caller IDs, content of the unread emails, text messages, notifications, etc. Nonetheless, the user can select respective icons presented in the overview 1108 to access such further information, or initiate presentation of another view to access the further information.

Figure 11B:
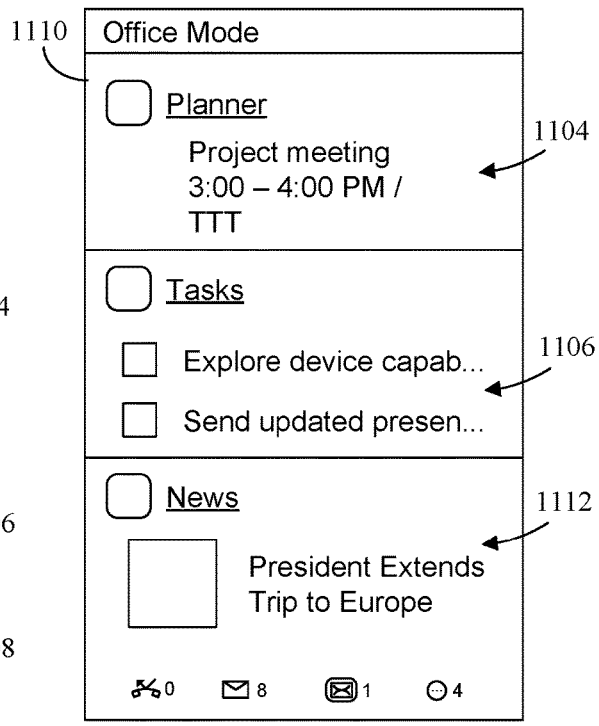
Figure 11C:
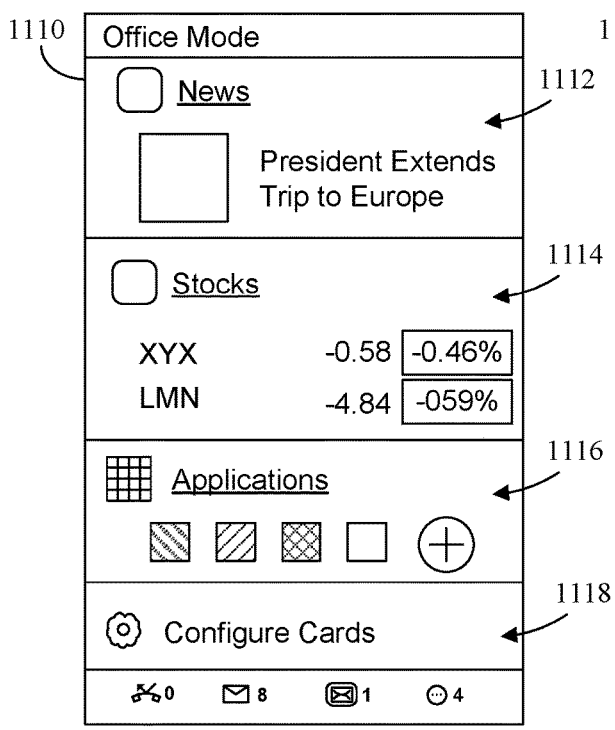

FIG. 11B depicts another example view 1110. The user can access the view 1110 by providing a user input gesture to the device 100, for example by selecting an active card presenting the scheduled meetings 1104 or scheduled tasks 1106. The view 1110 can present all active cards of the device 100. For example, in addition to active cards presenting the scheduled meetings 1104 or scheduled tasks 1106, the view can present an active card presenting news 1112. The view 1110 may be too large for all of the active cards to be presented on a display at once. A user can scroll down in the view, for example by swiping up, to view additional active cards, for example an active card 1114 presenting information about the stock market and an active card 1116 presenting use selectable icons the user can select to launch applications, as depicted in FIG. 11C. Further, the view 1110 can present a user selectable control/icon 1118 the user can select to manage active cards.

Figure 11D:
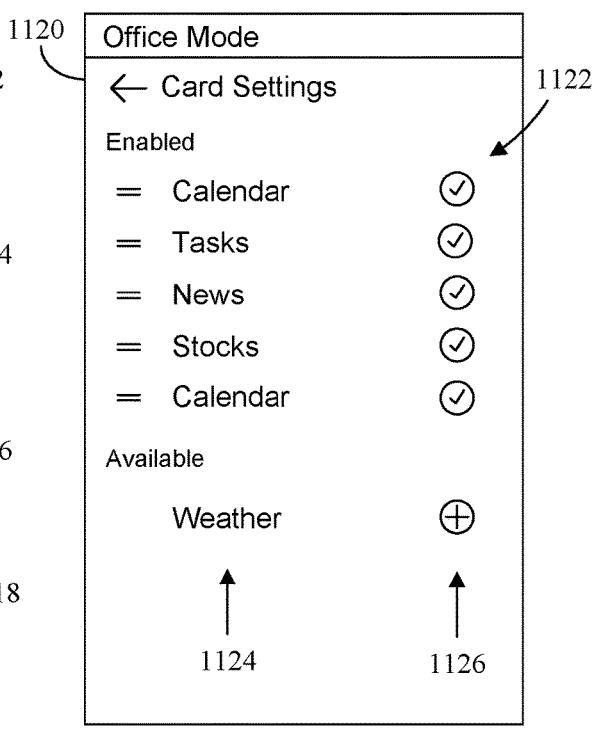

FIG. 11D depicts another example view 1120. The user can access the view 1120 by providing a user input gesture to the device 100, for example by selecting the control/icon 1118 of FIG. 11C. The view 1120 can present a menu 1122 of active cards 1124 via which the user can configure the active cards. The menu 1122 can indicate which active cards 1124 currently are enabled and which active cards 1124 currently are disabled. From the menu, the user can select icons/buttons 1126 associated with the active cards 1124. Further, the user can select any of the active cards 1124 from the menu 1122 to further configure the active cards 1124.

Figure 11E:
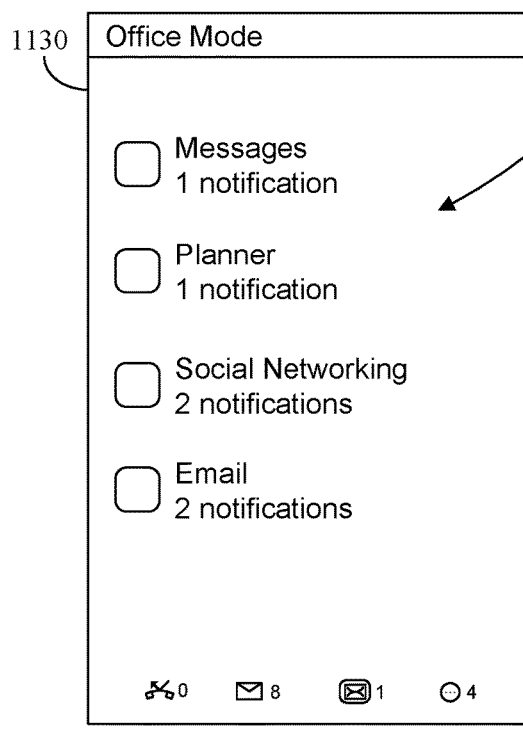

FIG. 11E depicts another example view 1130. The user can access the view 1130 by providing a user input gesture to the device 100, for example by selecting the overview 1108 of primary notification categories (FIG. 11A) and swiping up. The view 1130 can present individual categories 1132 of notifications. The view 1130 can include an authentication requirement in order to view further information related to the category notifications, for example a personal identification number (PIN), a fingerprint authentication, a facial recognition authentication, etc. Responsive to the user authenticating with the device 100, further information can be presented.

Figure 11F:
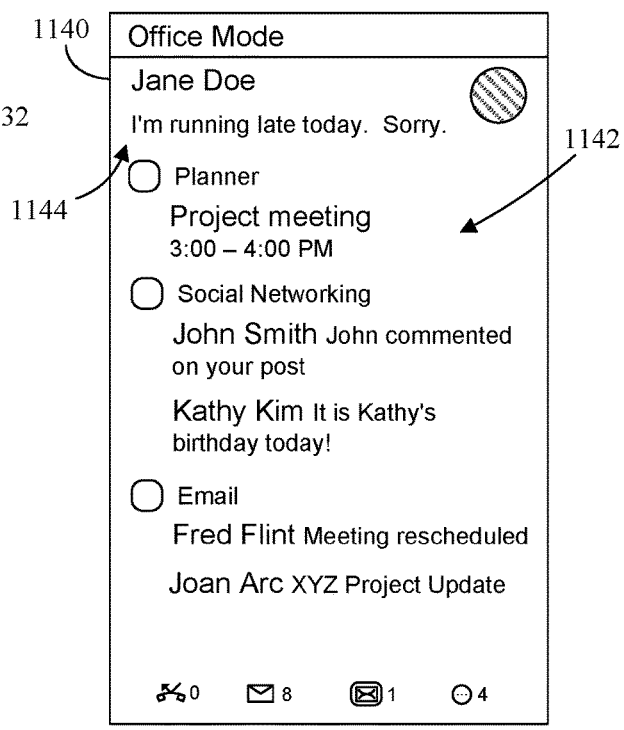

FIG. 11F depicts another example view 1140. The user can access the view 1140 by providing the requisite user authentication to the device 100/view 1030. The view 1140 can present further information 1142 related to the categories 1132 of notifications (FIG. 11E). The user can select a particular category or particular piece of information in a category to view further notifications in that category. For example, if the user selects a message 1144, a plurality of messages can be presented to the user.

Figure 11G:
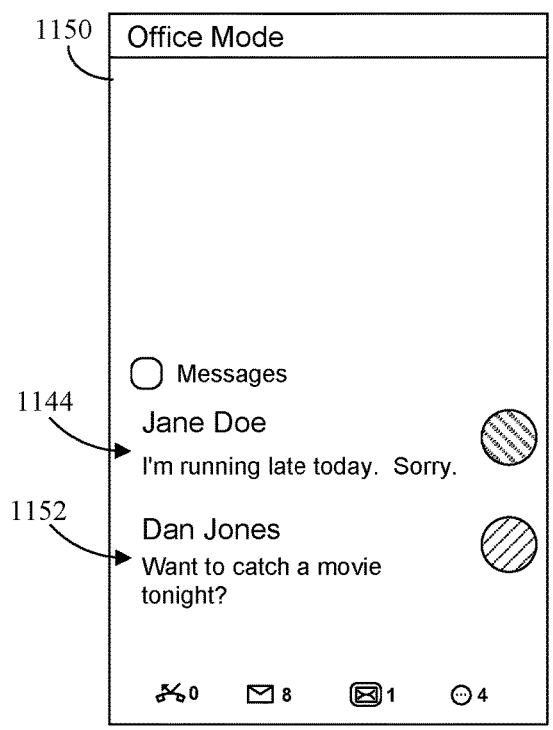

FIG. 11G depicts another example view 1150. The user can access the view 1150 by selecting the message 1144 (FIG. 11F). The view 1150 can present the message 1144 and one or more additional messages 1152. The additional messages 1152 can include other unread messages, messages received in a previous time period (e.g., last hour, last day, etc.), messages from one or more specific groups of contacts, etc. Of course, if the user selects another category 1132 of notifications, notifications from the selected category can be presented in the view 1150.

The terminology used herein is for the purpose of describing particular embodiments only and is not intended to be limiting. Notwithstanding, several definitions that apply throughout this document now will be presented.

As defined herein, the term "charger" means an apparatus that provides power to a device to charge one or more batteries of the device. A charger also may provide power to a device to allow the device to operate without depleting charge of the battery or batteries.

As defined herein, the term "device use context" means a context in which a device is used.

As defined herein, the term "current device use context" means a context in which a device currently is being used.

As defined herein, the term "power charging state" means a state in which a device receives power from a charger to charge one or more batteries of the device or to operate without depleting charge of the battery or batteries.

As defined herein, the term "user interface" means a set of one or more user interface views that are assigned to the same device use context.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process. As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   detecting that a device is in a power charging state;
   responsive to detecting that the device is in the power charging state, determining, using a processor, a current device use context associated with the power charging state;
   selecting, using the processor, a user interface that corresponds to the current device use context associated with the power charging state;
   while the device is in the power charging state, presenting the selected user interface;
   receiving, from a charger to which the device is coupled, a list of available input/output devices and capabilities of the input/output devices;
   communicatively linking the device to at least one of the input/output devices; and
   presenting, via a view of the selected user interface, a set of device features that support user interaction with the at least one of the input/output devices.

2. The method of claim 1, further comprising:
   receiving, from a charger to which the device is coupled, a charger identifier that indicates a type of the charger;
   wherein the current device use context is determined based on the type of the charger to which the device is coupled.

3. The method of claim 1, further comprising:
   receiving, from a charger to which the device is coupled, a charger identifier that indicates a unique identifier assigned to the charger;
   wherein the current device use context is determined based on the unique identifier assigned to the charger.

4. The method of claim 1, further comprising:
   receiving, from a charger to which the device is coupled, data indicating a device use context associated with the charger;
   wherein the current device use context is determined based on the device use context associated with the charger.

5. The method of claim 1, wherein the current device use context is determined based on information indicating at least one input/output device available to the device.

6. The method of claim 1, wherein the current device use context is determined based on information obtained from at least one sensor, the at least one sensor selected from a group consisting of a location sensor, a movement sensor and an environmental information sensor.

7. The method of claim 1, wherein the current device use context is selected from a group consisting of a bedside device use context, a vehicle device use context, and a workplace device use context.

8. The method of claim 1, wherein:
   if the current device use context is determined to be a first device use context, the user interface presents, via a first user interface view, a first set of device features; and
   if the current device use context is determined to be a second device use context distinct from the first device use context, the user interface presents, via a second user interface view, a second set of features;
   wherein the second user interface view is at least partially distinct from the first user interface view, and the second set of features is at least partially distinct from the first set of features.

9. The method of claim 1, further comprising:
   receiving by the device, from the charger to which the device is coupled, information from at least one sensor of a vehicle in which the charger is located.

10. The computer program product of claim 1, wherein the program code is executable by the processor to perform operations further comprising:
    receiving by the device, from the charger to which the device is coupled, information from at least one sensor of a vehicle in which the charger is located.

11. A method comprising:
  detecting, using a processor, a device being coupled to a charger;
  communicating, using the processor, from the charger to the device data indicating a device use context associated with the charger, wherein the device determines a current device use context based on the device use context associated with the charger, the device selects a user interface that corresponds to the current device use context and, while the device is in a power charging state, the device presents the selected user interface; and
  responsive to the device being coupled to the charger, communicating from the charger to the device a list of available input/output devices and capabilities of the input/output devices, wherein the device communicatively links to at least one of the input/output devices and presents, via a view of the selected user interface, a set of device features that support user interaction with the at least one of the input/output devices.

12. The method of claim 11, further comprising:
  detecting a setting of a user control of the charger; and
  determining, by the charger, the device use context associated with the charger based on the setting of the user control.

13. The method of claim 11, further comprising:
  receiving, by the charger, sensor data from at least one sensor; and
  determining, by the charger, the device use context associated with the charger based on the sensor data.

14. The method of claim 11, further comprising:
  receiving, by the charger, information from at least one sensor of a vehicle in which the charger is located; and
  communicating, from the charger to the device, the information from the at least one sensor of the vehicle in which the charger is located.

15. A computer program product comprising a computer readable storage medium having program code stored thereon, the program code executable by a processor to perform operations comprising:
  detecting that a device is in a power charging state;
  responsive to detecting that the device is in the power charging state, determining a current device use context associated with the power charging state;
  selecting a user interface that corresponds to the current device use context associated with the power charging state;
  while the device is in the power charging state, presenting the selected user interface,
  receiving, from a charger to which the device is coupled, a list of available input/output devices and capabilities of the input/output devices;
  communicatively linking the device to at least one of the input/output devices; and
  presenting, via a view of the selected user interface, a set of device features that support user interaction with the at least one of the input/output devices.

16. The computer program product of claim 15, wherein the program code is executable by the processor to perform operations further comprising:
  receiving, from a charger to which the device is coupled, a charger identifier that indicates a type of the charger;
  wherein the current device use context is determined based on the type of the charger to which the device is coupled.

17. The computer program product of claim 15, wherein the program code is executable by the processor to perform operations further comprising:
  receiving, from a charger to which the device is coupled, a charger identifier that indicates a unique identifier assigned to the charger;
  wherein the current device use context is determined based on the unique identifier assigned to the charger.

18. The computer program product of claim 15, wherein the program code is executable by the processor to perform operations further comprising:
  receiving, from a charger to which the device is coupled, data indicating a device use context associated with the charger;
  wherein the current device use context is determined based on the device use context associated with the charger.

19. The computer program product of claim 15, wherein the current device use context is determined based on information indicating at least one input/output device available to the device.

20. The computer program product of claim 15, wherein the current device use context is determined based on information obtained from at least one sensor, the at least one sensor selected from a group consisting of a location sensor, a movement sensor and an environmental information sensor.

21. The computer program product of claim 15, wherein the current device use context is selected from a group consisting of a bedside device use context, a vehicle device use context, and a workplace device use context.

22. The computer program product of claim 15, wherein:
  if the current device use context is determined to be a first device use context, the user interface presents, via a first user interface view, a first set of device features; and
  if the current device use context is determined to be a second device use context distinct from the first device use context, the user interface presents, via a second user interface view, a second set of features;
  wherein the second user interface view is at least partially distinct from the first user interface view, and the second set of features is at least partially distinct from the first set of features.

23. A computer program product comprising a computer readable storage medium having program code stored thereon, the program code executable by a processor to perform operations comprising:
  detecting a device being coupled to a charger;
  communicating from the charger to the device data indicating a device use context associated with the charger, wherein the device determines a current device use context based on the device use context associated with the charger, the device selects a user interface that corresponds to the current device use context and, while the device is in a power charging state, the device presents the selected user interface; and
  responsive to the device being coupled to the charger, communicating from the charger to the device a list of available input/output devices and capabilities of the input/output devices, wherein the device communicatively links to at least one of the input/output devices and presents, via a view of the selected user interface, a set of device features that support user interaction with the at least one of the input/output devices.

24. The computer program product of claim 23, wherein the program code is executable by the processor to perform operations further comprising:
- detecting a setting of a user control of the charger; and
- determining, by the charger, the device use context associated with the charger based on the setting of the user control.

25. The computer program product of claim 23, wherein the program code is executable by the processor to perform operations further comprising:
- receiving, by the charger, sensor data from at least one sensor; and
- determining, by the charger, the device use context associated with the charger based on the sensor data.

\* \* \* \* \*